United States Patent
Xia et al.

(10) Patent No.: US 9,355,765 B2
(45) Date of Patent: May 31, 2016

(54) NANO PARTICLE/POLYAMIDE COMPOSITE MATERIAL, PREPARATION METHOD THEREFOR, AND USE THEREOF

(75) Inventors: Housheng Xia, Shanghai (CN); Guisheng Yang, Shanghai (CN)

(73) Assignee: Shanghai Genius Advanced Material (Group) Co., Ltd., Shanghai (CN)

(*) Notice: Subject to any disclaimer, the term of this patent is extended or adjusted under 35 U.S.C. 154(b) by 161 days.

(21) Appl. No.: 13/977,409

(22) PCT Filed: Dec. 26, 2011

(86) PCT No.: PCT/CN2011/084661
§ 371 (c)(1),
(2), (4) Date: Oct. 11, 2013

(87) PCT Pub. No.: WO2012/089081
PCT Pub. Date: Jul. 5, 2012

(65) Prior Publication Data
US 2014/0048738 A1 Feb. 20, 2014

(30) Foreign Application Priority Data

Dec. 28, 2010 (CN) .......................... 2010 1 0609499

(51) Int. Cl.
*C08L 77/02* (2006.01)
*C08K 3/22* (2006.01)
(Continued)

(52) U.S. Cl.
CPC ... *H01F 1/01* (2013.01); *B01J 2/00* (2013.01); *B01J 2/20* (2013.01); *C08K 3/00* (2013.01);
(Continued)

(58) Field of Classification Search
CPC .......... C08L 77/02; C08K 3/22; C08G 69/16; C08G 69/18
See application file for complete search history.

(56) References Cited

U.S. PATENT DOCUMENTS 3,214,414 A * 10/1965 Waltersperger ........ C08G 69/16
524/745
2014/0048738 A1 * 2/2014 Xia et al. .................... 252/62.54

FOREIGN PATENT DOCUMENTS

CN 1422901 6/2003
CN 1422901 A * 6/2003 ............... C08J 5/005
(Continued)

OTHER PUBLICATIONS

Machine translated English language equivalent of CN 1796456 A (Jul. 2006, 7 pages).*

(Continued)

*Primary Examiner* — Brieann R Fink
(74) *Attorney, Agent, or Firm* — Avery N. Goldstein; Blue Filament Law

(57) ABSTRACT

A nano particle/polyamide composite material, a preparation method, and a use thereof are disclosed. The nano particle/polyamide composite material includes 0.01-99 parts by weight of inorganic nano particles and 1-99.99 parts by weight of a polyamide matrix. The preparation method for the nano particle/polyamide composite material includes hydrolysis polymerization or anionic polymerization. The inventive nano particle/polyamide composite material has the particular functions of nano materials, while having the advantages of the polymer matrix including good mechanical performance for easy processing and molding. The nano particle is well dispersed in the polyamide matrix, is physically stable, and has a strong interaction at an interface between the nano particles and the polymer matrix, thus being useful as a structural material, a functional material, and a polymer masterbatch. The low cost of raw materials used in the environment friendly synthesis method, and the simple production apparatus are well suited for large-scale industrial production.

10 Claims, 2 Drawing Sheets

(51) Int. Cl.

| | |
|---|---|
| *C08G 69/16* | (2006.01) |
| *C08G 69/18* | (2006.01) |
| *H01F 1/01* | (2006.01) |
| *C08K 3/00* | (2006.01) |
| *B01J 2/00* | (2006.01) |
| *B01J 2/20* | (2006.01) |
| *B82Y 40/00* | (2011.01) |

(52) U.S. Cl.
CPC ........... *B82Y 40/00* (2013.01); *C08K 2201/011* (2013.01); *Y10S 977/783* (2013.01); *Y10S 977/897* (2013.01)

(56) References Cited

FOREIGN PATENT DOCUMENTS

| CN | 1549283 | | 11/2004 |
|---|---|---|---|
| CN | 1796456 A | * | 7/2006 |
| CN | 1796460 A | * | 7/2006 |
| CN | 1844242 | | 10/2006 |
| CN | 101225227 | | 7/2008 |
| CN | 101245212 | | 8/2008 |
| CN | 101864167 | | 10/2010 |

OTHER PUBLICATIONS

Machine translated English language equivalent of CN 1796460 A (Jul. 2006, 7 pages).*

Machine translated English language equivalent of CN 1422901 (Jun. 2003, 5 pages).*

Zhen Li, Hui Chen, Haobo Bao, Mingyuan Gao, Chemistry of Materials, Apr. 20, 2004, vol. 16 No. 8.

Zhen Li, Qiao Sun, Mingyuan Gao, Preparation of Water-Soluble Magnetite Nanocrystals from Hydrated Ferric Salts in 2-Pyrrolidone: Mechanism Leading to Fe3O4, 2005, 123-126.

Andong Liu, Tingxiu Xie, Guisheng Yang, Synthesis of Exfoliated Monomer Casting Polyamide 6/Na-Montmorillonite Nanocomposites by Anionic Ring Opening Polymerization.

* cited by examiner

NANO PARTICLE/POLYAMIDE COMPOSITE MATERIAL, PREPARATION METHOD THEREFOR, AND USE THEREOF

TECHNICAL FIELD

The invention belongs to the technical field of polymer composite materials, and relates to a nano particle/polyamide composite material, a preparation method therefor and a use thereof.

BACKGROUND OF THE INVENTION

Nano materials refer to substances at least one dimension of which is within a nano scale range (1-100 nm) in a three-dimensional space, and such materials typically exhibit different melting point, magnetic property, optical property, thermal conductivity and electrical conductivity from bulk materials due to nano-size effect, therefore, they have extensive application prospect in such fields as photoelectrical material, ceramic material, sensor, semiconductor material, catalytic material and medical care. However, nano materials are usually prepared under rigorous conditions and at high cost, so use of these nano materials as additive in preparation for a nano composite material becomes an effective measure to lower the cost and popularize the nano materials. Polyamide, a type of important engineering plastic, has excellent comprehensive properties, including mechanical property, heat resistance, abrasion resistance, chemical resistance and self-lubricating property, and is low in coefficient of friction and easy to process. There are various types of polyamide, like nylon 6, nylon 4, nylon 12 and nylon 6/12; with a large amount of polar amide bonds therein, these materials are extremely suitable for use as a matrix material and other inorganic materials in preparation for composite material, especially for use as a matrix for nano composite material. Researchers have shown that addition of nano particles into polyamide typically imparts to polyamide properties that are not originally present in polyamide, e.g. reinforcement, toughening, abrasion resistance, high temperature resistance and improvement of processability and functionality. For example, compounding of magnetic nano particles and polyamide results in a magnetic nano particle/polyamide composite material that is small in relatively density and can be easily manufactured into a product with high dimensional precision and complex shape, thus overcoming the defect that a product with complex and fine shape cannot be manufactured by original ferrite magnets, rare earth magnets and Al—Ni—Co alloy magnets due to their high hardness and brittleness and poor processability.

At present, common preparation methods for a nano particle/polyamide composite material includes a blending method, a sol-gel method and an in-situ synthesis method.

The blending method refers to mixing of nano particles and polyamide polymer by means of solvent blending, emulsion blending, melt blending and mechanical blending and the like. It has the advantages of good simplicity, convenience, and low cost. Synthesis of nano materials and material are carried out step by step so that the morphology and size of the nano particles can be controlled, however, owing to small size of these nano particles and high viscosity of polyamide, they are difficult to be blended in and uniformly dispersed, which typically will degrade the mechanical properties of the nano particle/polyamide composite material significantly. In order to improve the compatibility between the nano particles and the polyamide composite material, surface modification is normally employed to promote uniform dispersion of the nano materials and strength an action force at an inorganic/organic interface. The procedure of surface modification is not only time-consuming and labor-consuming, but is also quite difficult to reach ideal effects.

As a common method for nano material synthesis, the sol-gel method typically means that a precursor for nano material synthesis is dissolved in a certain solvent and then hydrolyzed or alcoholized to form sol, the sol is then subjected to solvent volatilization or heating to achieve gelation so as to generate nano particles. When the sol-gel method is used for preparing a nano particle/polyamide composite material, a precursor for nano material synthesis is introduced to a polyamide matrix material at first and then hydrolyzed or and gelated in the polyamide matrix to directly generate the uniformly-dispersed nano particle/polyamide composite material. This method has such a characteristic that it can be carried out under mild reaction conditions. Its two-phase dispersion is more uniform than the blending method. But it has the following shortcoming that, in the process of gel drying, volatilization of solvent, small molecules and water is likely to cause shrinkage and embrittlement of the material, furthermore, it is quite difficult to introduce a large amount of the nano particle precursors to the polymer matrix, therefore, the properties of the material are improved to a limited extent.

The in-situ polymerization method means that, nano particles are directly dispersed in monomer for polyamide synthesis and then monomer polymerization is initiated under particular conditions to form a nano particle/polyamide composite material. As an effective measure for synthesizing the nano particle/polyamide composite material, the method has the advantages of completely independent controllability of nano particle filler and wide selection range for polymer matrix. At present, many documents that describe use of the in-situ polymerization method for preparing the nano particle/polyamide composite material have been reported, e.g. LIU, Andong, et al. nano Na-montmorillonite is uniformly dispersed in nylon 6 matrix caprolactam and a montmorillonite/nylon 6 composite material is prepared by anionic ring opening polymerization [For more details, please see: Liu A., Xie T., Yang G. "Synthesis of exfoliated monomer casting polyamide 6/$Na^+$-montmorillonite nanocomposites by anionic ring opening polymerization." Macromol. Chem. Phys., 2006(207):701-707]. However, the in-situ polymerization method is still difficult to achieve ideal dispersion of the nano particles in the polyamide matrix, and since the nano particles serving as raw material are usually high in production cost and poor in stability, high difficulty is brought to industrial production of the nano particle/polyamide composite material.

Lactam shows strong polarity because amide bonds are contained in a ring structure, as a result, and in addition to use as a solvent for dispersing inorganic nano materials excellently (e.g. montmorillonite, nano-silica, nano-hydroxyapatite), it has a quite strong dissolving capacity for a plurality of water-soluble inorganic salts (e.g. $AgNO_3$, $ZnCl_2$, $FeCl_3$ and NaOH) and oil-soluble metal or semimetal organic compounds (e.g. carbonyl iron and ethyl orthosilicate). Therefore, the nano material can be synthesized by dissolving the water-soluble inorganic salts or the oil-soluble metal or semimetal organic compounds in the lactam solvent and then adopting a proper method. For example, Gao, et al, have synthesized superparamagnetic ferroferric oxide with a particle diameter less than 20 nm respectively by carbonyl iron and ferric trichloride in a butyrolactam solvent [For more details, please see the document below: One-Pot Reaction to Synthesize Water-Soluble Magnetite Nanocrystals, Chem. Mater., Vol. 16, No. 8, 2004; Preparation of Water-Soluble Magnetite Nanocrystals from Hydrated Ferric Salts in 2-Pyrrolidone: Mechanism Leading to $Fe_3O_4$, Angew. Chem. Int. Ed. 2005, 44, 123-126]. So far, most of the documents or patents have been reported only in the aspect of use of lactam as a solvent for nano material synthesis, in addition, in order to obtain pure nano material powder, complex post-treatment procedures are needed in general, such as washing, separation and drying, therefore, the cost of nano material synthesis is remarkably increased and the problems of environmental pollution and increase of energy consumption are aroused. If the nano particle/lactam mixture obtained in the nano material synthesis process featured by use of the lactam as a solvent is not separated, instead, the lactam is directly polymerized to form polyamide polymer, this will be an effective measure for preparing the nano particle/polyamide composite material.

SUMMARY OF THE INVENTION

Aiming at such a shortage that nano particles are quite difficult to be uniformly dispersed in a polyamide matrix and accordingly cannot fully exhibit their efficacies to further affect the mechanical performance of a composite material, an objective of the invention is to provide a nano particle/polyamide composite material, in which the nano particles are well dispersed and physically stable in the polyamide matrix. There is a strong interaction at an interface between the nano particles and the polymer matrix. The mechanical performance of the composite material are high.

Aiming at the shortages of the blending, sol-gel and in-situ synthesis methods in the prior art for preparation of the nano particle/polyamide composite material that the nano particle is hardly uniformly dispersed, high in product cost and unsuitable for large-scale production; in particular, for the shortages of complex process and large energy consumption of pollution in the post-treatment process of using lactam as a solvent for nano material synthesis, another objective of the invention is to provide a preparation method for the nano particle/polyamide composite material.

The third objective of the invention is to provide a use of the nano particle/polyamide composite material as a structural material, a functional polymer material and a polymer masterbatch.

The technical scheme of the present invention is as follows:

The invention provides a nano particle/polyamide composite material. The composite material comprises 0.01-99 parts by weight of inorganic nano particles and 1-99.99 parts by weight of a polyamide matrix.

There are 0.5-60 parts by weight of the inorganic nano particles and 40-99.5 parts by weight of the polyamide matrix.

The polyamide is a polymer or a homopolymer formed by polymerization of lactam as monomer, and is further selected from nylon 4, nylon 6, nylon 7, nylon 8, nylon 9, nylon 10, nylon 11, nylon 12, nylon 4/6, nylon 4/12, nylon 6/10, nylon 6/12 or nylon 4/6/12, preferably nylon 6/12, nylon 6 or nylon 12.

The lactam has a structural general formula:

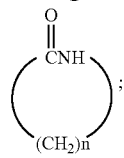

$3 \leq n \leq 14$ and is selected from butyrolactam, valerolactam, caprolactam, oenantholactam, capryloctam, azelaic lactam, capric lactam, undecenolactam or urolactam, preferably butyrolactam, caprolactam or laurolactam, more preferably caprolactam.

The inorganic nano particle is selected from one or more than one of hydroxide, oxide, sulfide, metal or inorganic salt;

the hydroxide refers to a water-insoluble or slightly-water-soluble inorganic compound formed by one or more than one metal elements and hydroxyl, and is further selected from one or more than one of $Ni(OH)_2$, $Mg(OH)_2$, $Al(OH)_3$, $Nd(OH)_3$, $Y(OH)_3$, Mg—Al hydrotalcite or Zn—Al hydrotalcite, preferably $Mg(OH)_2$ or $Nd(OH)_3$;

the oxide refers to a water-insoluble or slightly-water-soluble inorganic compound formed by one or more than one metal elements or metalloid elements and oxygen, and is further selected from one or more than one of $Ag_2O$, ZnO, $Cu_2O$, $Fe_3O_4$, $SiO_2$, $MgAl_2O_4$ or $CaTiO_3$, preferably $Ag_2O$, ZnO, $Cu_2O$ or $Fe_3O_4$;

the sulfide is selected from water-insoluble or slightly-water-soluble inorganic compounds formed by combination of metal or metalloid elements and sulfur, selenium, tellurium, arsenic or antimony, and is further selected from one or more than one of CuS, ZnS, CdS, CdSe, CdTe, $WSe_2$, CuTe, $CoAs_2$ or GaAs, preferably ZnS, CdS, CdSe or CdTe;

the metal is selected from water-insoluble or slightly-water-soluble materials of one or more than one metal elements in Groups IIIA, IVA, I B, II B or VIII in the periodic table of elements, and is further selected from alloys or mixtures composed of one or more than one of Fe, Ni, Cu, Ag, Pd, Pt, Au or Ru, preferably Cu, Ag, Au, Pd or Cu—Ag alloy;

and the inorganic salt refers to a water-insoluble or slightly-water-soluble inorganic compound formed by metal element cation and carbonate radical, sulfate radical, silicate radical or halogen anion, and is further selected from one or more than one of $CaCO_3$, $MgCO_3$, $BaSO_4$, $CaSiO_3$, AgCl, AgBr or $CaF_2$, preferably $MgCO_3$, $BaSO_4$ or AgCl.

The inorganic nano particles are magnetic particles.

The chemical composition of the magnetic particle is selected from one of $Fe_3O_4$, $Ni_3O_4$, $Co_3O_4$ or $Mn_3O_4$.

The invention further provides a preparation method for the nano particle/polyamide composite material; the method comprises hydrolysis polymerization or anionic polymerization.

preparation for the nano particle/polyamide composite material by the hydrolysis polymerization comprises the following steps: a mixture of 0.01-99 parts by weight of nano particles and 100 parts by weight of lactam is added to a reactor; 0.1-20 parts by weight of deionized water, 0.01-5 parts by weight of catalyst and 0.001-1 part by weight of molecular weight regulator are then added; followed by uniform stirring, mixing under the temperature of 80-100° C.; the reactor is sealed and heated up to 120-300° C.; the pressure is constantly maintained at 0.1-3.0 MPa, and hydrolytic reaction is performed for 0.5-48 h; the reactor is opened for pressure release in order to reach a standard atmospheric pressure; evacuation is performed for 0.1-10 h under stirring at the temperature of 180-300° C.; and the nano particle/polyamide composite material is obtained by discharging, strip pulling, cooling and pelletizing.

the catalyst is a substance in which $H^+$ can be ionized, and is further selected from hydrochloric acid, sulfuric acid, formic acid, acetic acid, aminovaleric acid or aminocaproic acid, preferably aminocaproic acid;

the molecular weight regulator refers to a single-functionality end-capping agent capable of regulating the molecular weight of polyamide, and is further selected from organic monoacid or organic monoamine, preferably acetic acid, hexanoic acid or hexylamine, more preferably hexanoic acid.

Preparation for the nano particle/polyamide composite material by the anion polymerization comprises the following steps:

a mixture of nano particles and lactam is added to a reactor; the nano particles is 0.01-99 parts by weight; and the lactam is 100 parts by weight; evacuation is performed for 0.1-20 h at the temperature of 80-200° C.; 0.01-10 parts by weight of a catalyst is added; water removal by evacuation is performed for 0.1-10 h at the temperature of 100-180° C., and the nano particle/polyamide composite material is obtained by polymerization according to one of the following three methods:

(1) the resultant product is transferred into a preheated mould; the temperature is constantly maintained for 0.1-12 h at the temperature of 180-300° C.; and the nano particle/polyamide composite material is obtained by polymerization;

or: (2) the resultant product is cooled down to 80-180° C.; 0.01-10 parts by weight of activator is added; uniform mixing is performed; the mixture is transferred to a preheated mould; the temperature is constantly maintained for 0.1-12 h at the temperature of 120-200° C.; and the nano particle/polyamide composite material is obtained by polymerization;

or: (3) the resultant product is cooled to 80-160° C.; 0.01-10 parts by weight of activator is added; uniform mixing is performed; and the mixture is transferred to a double-screw extruder for reaction and extrusion so as to obtain the nano particle/polyamide composite material;

the reaction and extrusion operations are as follows: a mixture of the nano particles, lactam, catalyst and activator is added through a double-screw inlet at the speed of 0.1-10000 g/min; the screws of double-screw extruder rotate at a speed of 50-500 r/min, and the temperatures are as follows: 80-150° C. for area I, 120-200° C. for area II, 200-240° C. for area III, 200-280° C. for area IV, 220-280° C. for area V, 220-280° C. for area VI and 220-250° C. for area VII; then the material is extruded from the outlet, cooled down and pelletized.

the catalyst is a substance being capable of driving lactam to form an anion active center, and is selected from alkaline metal, alkaline metal hydroxide or alkaline metal organic salt, further selected from Na, K, NaOH, KOH, NaOCH$_3$, NaOC$_2$H$_5$, KOC$_2$H$_5$, sodium butyrolactam, sodium caprolactam, potassium caprolactam or sodium phenolate, preferably NaOH, NaOC$_2$H$_5$ or sodium caprolactam;

the activator is a substance capable of lowering the anion polymerization temperature of lactam, and is further selected from acyl chloride, maleic anhydride, isocyanate, N-acyl caprolactam, carbonic ester or carboxylic ester, preferably from toluene-2, 4-diisocyanate or N-acetylcaprolactam.

The preparation method for the mixture of nano particles and the lactam composite material comprises a precipitation method, a sol-gel method or a high temperature pyrolysis method.

synthesis of the mixture of nano particles and the lactam by the precipitation method comprises the following steps: 0.01-100 parts by weight of a precursor and 100 parts by weight of lactam are added to a reactor, which are stirred for 0.1-2 h at the temperature of 80-150° C. so that the precursor is fully dissolved or dispersed in a molten lactam solvent; 0.05-50 parts by weight of a precipitator is added under stirring to complete precipitation reaction for 0.1-200 h at the temperature of 80-250° C., thus the mixture of nano particles and the lactam is obtained.

The lactam purity of lactam solvent is no less than 60% and the moisture of lactam solvent is not more than 20%.

The precursor is selected from soluble inorganic salts formed by metal cation and halogen, nitrate, nitrite, sulfate, sulfite or carbonate anion, and is further selected from MgCl$_2$.6H$_2$O, Nd(NO$_3$)$_3$.6H$_2$O, Y(NO$_3$)$_3$.6H$_2$O, AlCl$_3$.9H$_2$O, Al$_2$(SO$_4$)$_3$.18H$_2$O, ZnCl$_2$, AgNO$_3$, CuSO$_4$.5H$_2$O, FeCl$_2$.4H$_2$O, FeCl$_3$.6H$_2$O, Cd(NO$_3$)$_2$.2H$_2$O, BaCl$_2$ or PdCl$_2$; or the precursor is selected from the organic compounds containing metals or metalloids, and is further selected from zinc acetate, carbonyl iron, ferric acetylacetonate, iron oleate, butyl titanate or ethyl orthosilicate.

The precipitator is selected from alkaline metal, alkaline metal hydroxide, alkaline metal organic salt, ammonia and compounds capable of hydrogen release by pyrolysis, soluble inorganic salt formed by metal element and halogen element, soluble inorganic salt formed by metal element and chalcogenide, soluble inorganic salt formed by metal element and carbonate radical, or soluble inorganic salt formed by metal element and sulfate radical; wherein: the alkaline metal is further selected from Li, Na or K; the alkaline metal hydroxide is further selected from NaOH or KOH; the alkaline metal organic salt is further selected from sodium methylate, sodium alcoholate, sodium phenolate, potassium oleate, sodium lactam or potassium caprolactam; ammonia and compounds capable of hydrogen release by pyrolysis are further selected from ammonia, ammonia water, urea, ammonium carbonate or ammonium hydrogen carbonate, preferably ammonia water; the soluble inorganic salt formed by metal element and halogen element is further selected from NaCl, KCl, MgCl$_2$, CaCl$_2$, AlCl$_3$.6H$_2$O, FeCl$_2$.4H$_2$O or FeCl$_3$.6H$_2$O, preferably from NaCl or KCl; the soluble inorganic salt formed by metal element and chalcogenide is further selected from Na$_2$S, K$_2$S, Na$_2$S.9H$_2$O, Na$_2$Se or NaHTe; the soluble inorganic salt formed by metal element and carbonate radical is further selected from Na$_2$CO$_3$ or K$_2$CO$_3$; and the soluble inorganic salt formed by metal element and sulfate radical is further selected from Na$_2$SO$_4$ or K$_2$SO$_4$.

0.05-50 parts by weight of a reducing agent is further added after addition of the precipitator in the process of synthesizing the mixture of nano particle/lactam by the precipitation method.

Synthesis of the mixture of nano particles and the lactam by the sol-gel method comprises the following steps: 0.01-100 parts by weight of a hydrolyzable precursor and 100 parts by weight of lactam are added to a reactor; which are stirred for 0.1-2 h at the temperature of 80-150° C. so that the precursor is fully dissolved or dispersed in a molten lactam solvent; 0.01-50 parts by weight of water is added for the purpose of hydrolysis reaction for 0.01-48 h at the temperature of 80-250° C. to obtain sol; and the sol is subjected to gelation for 0.01-96 h at the temperature of 80-270° C. to obtain the mixture of nano particles and the lactam.

The hydrolyzable precursor is selected from hydrolyzable inorganic salt or metal organic compound composed of metal cation and halogen, nitrate, sulfate or acetate anion, wherein: the hydrolyzable inorganic salt composed of metal cation and halogen, nitrate, sulfate or acetate anion is further selected from FeCl2.4H2O, FeCl3, FeCl3.6H2O, Fe(NO$_3$)$_3$.6H2O, Fe$_2$(SO$_4$)$_3$, AlCl$_3$, AlCl$_3$.6H$_2$O, CuSO$_4$.5H$_2$O, CuCl$_2$, CuCl$_2$.2H$_2$O, TiCl$_3$, TiCl$_4$ or Zn(OAc)$_2$.2H$_2$O, preferably FeCl3.6H2O or AlCl3; the metal organic compound is further selected from diethyl aluminum chloride, aluminum isopropoxide, diethyl zinc, ethyl orthosilicate, butyl titanate, ethyl titanium, preferably ethyl orthosilicate or butyl titanate.

The purity lofactam solvent is not less than 60% and the moisture of lactam solvent is not more than 30%.

0.05-50 parts by weight of a reducing agent is further added after hydrolysis reaction in the process of synthesizing the mixture of nano particle/lactam by the sol-gel method.

Synthesis of the mixture of nano particles and the lactam by the high temperature pyrolysis method comprises the following steps: 0.01-100 parts by weight of a pyrolyzable precursor and 100 parts by weight of lactam are added to a reactor, which are stirred for 0.1-2 h at the temperature of 80-150° C. so that the precursor is fully dissolved or dispersed in a molten lactam solvent, and pyrolysis reaction is performed for 0.1-20 h at the temperature of 100-270° C. to obtain the mixture of nano particles and the lactam.

The purity of lactam solvent is not less than 90% and the moisture is less than 1%; raw materials at the chemically pure level or higher levels are preferable.

The pyrolyzable precursor has a moisture of less than 10%, preferably less than 0.1%, and is selected from soluble inorganic salt that is pyrolyzable at the temperature not higher than 280° C. or metal organic compound that is pyrolyzable at the temperature not higher than 280° C.; wherein: the soluble inorganic salt that is pyrolyzable at the temperature not higher than 280° C. is further selected from $AgNO_3$, $FeCl_3$, $Zn(OAc)_2$ or $TiCl_4$; and the metal organic compound that is pyrolyzable at the temperature not higher than 280° C. is further selected from oleate salt, levulinate salt or carbonate salt, preferably oleic acid iron, zinc acetylacetonate or carbonyl iron($Fe(CO)5$).

0.05-50 parts by weight of an anion donor is further added after addition of lactam in the process of synthesizing the mixture of nano particles and the lactam by the high temperature pyrolysis method.

The anion donor is selected from compounds that are pyrolyzed at the temperature not more than 280° C. and capable of generating anions required by synthesized nano material, and is further selected from trioctylphosphine oxide (providing $O^{2-}$ required by oxide synthesis) or sulfide tetramethyl thiuram (providing $S^{2-}$ required by sulfide synthesis).

0.05-50 parts by weight of a reducing agent is further added prior to pyrolysis reaction at the temperature of 100-270° C. in the process of synthesizing the mixture of nano particles and the lactam by the high temperature pyrolysis method.

The reducing agent is selected from ascorbic acid, potassium borohydride, sodium borohydride, hydrazine, hydrazine hydrate, hydroxylamine, or aldehyde-containing organic compound; wherein: the aldehyde-containing organic compound is further selected from formaldehyde, acetaldehyde, glyoxal, benzaldehyde or glucose.

0.01-20 parts by weight of a stabilizing agent and 0.1-80 parts by weight of insoluble inorganic compound are further added after addition of lactam in the process of synthesizing the mixture of nano particles and the lactam by the precipitation method, the sol-gel method or the high temperature pyrolysis method.

The stabilizing agent is selected from anionic surfactant, cationic surfactant, amphoteric surfactant or nonionic surfactant, which regulates the appearance of synthesized nano material; wherein: the anionic surfactant is further selected from sodium dodecyl sulfate, sodium benzenesulfonate or sodium oleate; the cationic surfactant is further selected from tetrapropyl ammonium hydroxide, tetrapropylammonium bromide, tetrapropylammonium chloride, hexadecyl trimethyl ammonium bromide, hexadecyl trimethyl ammonium chloride or dodecyl trimethyl ammonium ammonium bromide; the amphoteric surfactant is further selected from dodecyl ethoxy sulfobetaine, octadecyl dihydroxyethyl amine oxide or stearamide propyl amine oxide; and the nonionic surfactant is further selected from triblock copolymer (P123, PEO-PPO-PEO), polyethylene glycol, polyvinyl pyridine, glycerol or 2-mercaptopropionic acid.

The insoluble inorganic compound refers to a substance serving as a carrier or an attachment point of synthesized nano material, and is further selected from activated carbon, graphene, carbon fiber, carbon nanotube, molecular sieve, smectite clay, diatomite, glass fiber or glass microsphere.

The method for synthesizing the mixture of nano particle/lactam by using lactam as a solvent further comprises co-use of the precipitation method, the sol-gel method of the high-temperature pyrolysis method.

A preparation method for the nano particle/polyamide composite material: the method comprises the following steps:

(1) preparation of a magnetic precursor/polymer monomer solution: 100 parts by weight of a polymer monomer is uniformly mixed with a magnetic precursor; the mixture is evacuated hermetically, nitrogen is fed in for 1-4 times to remove oxygen; the temperature is gradually raised to 80-120° C. for 10-60 min, so that the magnetic precursor is fully dissolved in the polymer monomer to form a dark brown solution;

(2) removement of water and impurity from the magnetic precursor/polymer monomer solution: the solution prepared in the step (1) refluxes at t 100-200° C. for 10-30 minutes in vacuum, thus a small amount of water and low-boiling-point impurities contained in the raw material are removed;

(3) preparation of magnetic particle/polymer monomer magnetic fluid: nitrogen is fed into the reaction system of the magnetic precursor/polymer monomer solution obtained from step (2) so as to reach a standard atmospheric pressure; 0.5-10 parts by weight of alkali is rapidly added; the temperature is raised to 100-200° C., and reflux for 0.5-3 h in vacuum to obtain the magnetic particle/polymer monomer magnetic fluid;

(4) in-situ polymerization of magnetic particle/polymer monomer magnetic fluid: the magnetic particle/polymer monomer magnetic fluid is cooled down to 100-180° C.; 0.2-1.0 part by weight of a polymerization activator is added, stirred and mixed with the fluid uniformly and rapidly; and polymerization reaction is performed for 0.2-2 h at 120-220° C.;

(5) the material prepared in the step (4) is crushed and then extracted with water for 4-16 h to remove unpolymerized polymer monomer, oligomer and soluble organic salts; the resultant product is fully dried at the temperature of 60-80° C. to obtain the magnetic composite polymer material.

The magnetic precursor is selected from a mixture of one or more than one of divalent soluble salts or trivalent soluble salts of Fe, Co, Ni or Mn, and is further selected from $FeCl_2$/$Fe_2(SO_4)_3$, $FeCl_2.4H_2O$/$FeCl_3.6H_2O$ or $MnCl_2$/$MnCl_3$, preferably $FeCl_2.4H_2O$/$FeCl_3.6H_2O$; and the molar ratio of divalent metal ions to trivalent metal ions in the magnetic precursor is 0.3-1.0, preferably 0.67.

In step (1), the particle diameter, mass percentage and saturation magnetization of the magnetic particles in the magnetic composite polymer material depends on the amount of the magnetic precursor added; the larger amount of the magnetic precursor, the larger particle diameter of the magnetic particles; the higher mass percentage, the larger saturation magnetization of the composite material.

The polymer monomer refers to a raw material corresponding to synthesis of high polymer; e.g. the polymer monomer corresponding to nylon 6 is caprolactam; the polymer monomer corresponding to nylon 4 is α-pyrrolidone; or the polymer monomer corresponding to nylon 4/6 is a mixture of α-pyrrolidone and caprolactam.

The alkali is selected from one of alkali metal, alkali metal hydroxide or alkali metal alkoxide, and is further selected from one of Na, K, NaOH, KOH, $NaOC_2H_5$ or $KOC_2H_5$.

The polymerization activator is selected from a mixture of one or more than one of acid chloride, acid anhydride, isocyanate or acyl caprolactam, and is further selected from benzoyl chloride, maleic anhydride, toluene-2, 4-diisocyanate or acetyl caprolactam.

The invention further provides a use of the nano particle/polyamide composite material as a structural material, a functional polymer material or a polymer masterbatch.

The method for using the nano particle/polyamide composite material as a structural material is as follows:

The nano particle/polyamide composite material is crushed (mainly aiming at bulky materials, e.g. casting-type composite material) and cooked in water at 0-100° C. for 0-100 h, and then filtered and dried for 0-48 h at the temperature of 50-200° C. to obtain the purified nano particle/polyamide composite material, which is manufactured into a product by injection molding or spinning.

The injection molding conditions are as follows: melting temperature: 220-300° C., injection pressure: 750-1250 bar, pressure maintaining time: 1-120 s and mould temperature: 20-100° C.;

The spinning conditions are as follows: melting temperature: 180-250° C., spinning head temperature: 240-280° C., pressure: 3.0-3.5 MPa and air cooling temperature at outlet: 5-100° C.

The method for using the nano particle/polyamide composite material as a functional polymer material is as follows:

the nano particle/polyamide composite material is crushed (mainly aiming at bulky materials, e.g. casting-type composite material) and cooked in water at f 0-100° C. for 0-100 h, and then filtered and dried for 0-48 h at the temperature of 50-200° C. to obtain the purified nano particle/polyamide composite material, which is manufactured into a functional polymer material by injection molding or spinning.

the injection molding conditions are as follows: melting temperature: 220-300° C., injection pressure: 750-1250 bar, pressure maintaining time: 1-120 s and mould temperature: 20-100° C.;

The spinning conditions are as follows: melting temperature: 180-250° C., spinning head temperature: 240-280° C., pressure: 3.0-3.5 MPa and air cooling temperature at outlet: 5-100° C.

The functional polymer refers to a composite material formed by nano particles with special functions (e.g. light, electricity and magnetism) and polyamide. The processing method is consistent with the structural material; however, it can be applied to special fields. For example, a nano $Fe_3O_4$/polyamide composite material can be applied to magnetic separation and electromagnetic shielding; a nano silver/polyamide composite material can be applied to conductive and antibacterial materials.

The method for using the nano particle/polyamide composite material as a polymer masterbatch is as follows:

The nano particle/polyamide composite material is crushed (mainly aiming at bulky materials, e.g. casting-type composite material) and cooked in water at 0-100° C. for 0-100 h, and then filtered and dried for 0-48 h at the temperature of 50-200° C. to obtain a polymer masterbatch.

A preparation method of a new nano composite material, the method comprises the following steps:

1-100 parts by weight of the polymer masterbatch prepared above and 100 parts by weight of thermoplastic plastic or elastomer are molten and blended at the temperature of 150-280° C. to obtain a new nano composite material, in order to improve the mechanical performance and color, or introduce new functions.

The thermoplastic plastic is selected from polyamide, polyester, polyolefin or polycarbonate, wherein: the polyamide is further selected from nylon 6 or nylon 66; the polyester is further selected from PET, PPT or PBT; the polyolefin is further selected from PE, PP, or ethylene-propylene copolymer;

The elastomer is selected from ethylene-propylene rubber or butadiene-styrene-butadiene copolymer.

The invention provides a magnetic composite polymer material. The material comprises magnetic particles and macromolecule polymer, and has a saturation magnetization of 0.5-10 emu/g, a magnetic particle content of 0.5-15 wt % and a particle diameter of 20-200 nm.

The chemical composition of the magnetic particle is selected from one of $Fe_3O_4$, $Ni_3O_4$, $Co_3O_4$ or $Mn_3O_4$.

The macromolecule polymer is selected from a mixture of one or more than one of homopolymer or copolymer formed by monomer anionic ring opening polymerization of caprolactam or α-pyrrolidone, and is further selected from a mixture of one or more than one of nylon 6, nylon 4 or nylon 4/6.

The invention further provides a preparation method of the magnetic composite polymer material, the method comprises the following steps:

(1) preparation of a magnetic precursor/polymer monomer solution: 100 parts by weight of a polymer monomer is uniformly mixed with a magnetic precursor; the mixture is evacuated hermetically; nitrogen is fed in for 1-4 times to remove oxygen; the temperature is gradually raised to 80-120° C. for 10-60 min, so that the magnetic precursor is fully dissolved in the polymer monomer to form a dark brown solution;

(2) removement of water and impurity from the magnetic precursor/polymer monomer solution: the solution prepared in the step (1) refluxes at 100-200° C. for 10-30 minutes in vacuum, thus a small amount of water and low-boiling-point impurities contained in the raw material are removed;

(3) preparation of magnetic particle/polymer monomer magnetic fluid: nitrogen is fed into the reaction system of the magnetic precursor/polymer monomer solution obtained from step (2) so as to reach a standard atmospheric pressure; 0.5-10 parts by weight of alkali is rapidly added; the temperature is raised to 100-200° C., and reflux for 0.5-3 h in vacuum to obtain the magnetic particle/polymer monomer magnetic fluid;

(4) in-situ polymerization of the magnetic particle/polymer monomer magnetic fluid: the magnetic particle/polymer monomer magnetic fluid is cooled down to 100-180° C.; 0.2-1.0 part by weight of a polymerization activator is added, stirred and mixed with the fluid uniformly and rapidly, and polymerization reaction is performed for 0.2-2 h at 120-220° C.;

(5) the material prepared in the step (4) is crushed and then extracted with water for 4-16 h to remove unpolymerized polymer monomer, oligomer and soluble organic salts, the resultant product is fully dried at the temperature of 60-80° C. to obtain the magnetic composite polymer material.

The magnetic precursor is selected from a mixture of one or more than one of divalent soluble salts or trivalent soluble salts of Fe, Co, Ni or Mn, and is further selected from $FeCl_2$/$Fe_2(SO_4)_3$, $FeCl_2.4H_2O$/$FeCl_3.6H_2O$ or $MnCl_2$/$MnCl_3$, preferably $FeCl_2.4H_2O$/$FeCl_3.6H_2O$; and the molar ratio of divalent metal ions to trivalent metal ions in the magnetic precursor is 0.3-1.0, preferably 0.67.

in step (1), the particle diameter, mass percentage and saturation magnetization of the magnetic particles in the magnetic composite polymer material depends on the amount of the magnetic precursor added; the larger amount of the magnetic precursor, the larger particle diameter of the magnetic particles; the higher mass percentage, the larger saturation magnetization of the composite material.

The polymer monomer refers to a raw material corresponding to synthesis of high polymer; e.g. the polymer monomer corresponding to nylon 6 is caprolactam; the polymer monomer corresponding to nylon 4 is α-pyrrolidone or the polymer monomer corresponding to nylon 4/6 is a mixture of α-pyrrolidone and caprolactam.

The alkali is selected from one of alkali metal, alkali metal hydroxide or alkali metal alkoxide, and is further selected from one of Na, K, NaOH, KOH, $NaOC_2H_5$ or $KOC_2H_5$.

The polymerization activator is selected from a mixture of one or more than one of acid chloride, acid anhydride, isocyanate or acyl caprolactam, and is further selected from benzoyl chloride, maleic anhydride, toluene-2, 4-diisocyanate (TDI) or acetyl caprolactam.

Compared with the prior art, the invention has the following advantages and beneficial effects:

1. The nano particle/polyamide composite material of the invention has the particular functions of nano materials, while having the advantages of the polymer matrix such as good mechanical performance, and being easy for processing and molding. In the nano particle/polyamide composite material of the invention, the nano particle is well dispersed in the polyamide matrix, is physically stable, and has a strong interaction at an interface between the nano particles and the polymer matrix.

2. The cost of raw materials used in the synthesis method is low; the production apparatus is simple; and the route is green and environment friendly. Therefore, the method is applicable to large-scale industrial production 3. The preparation method for the nano particle/polyamide composite material of the invention is wide in applicable scope, and can regulate and change the type and performance of the composite material by controlling the type of raw material for nano particle synthesis, the composition of lactam and the reaction conditions.

4. The nano particle/polyamide composite material prepared in the invention can be used as a structural material, a functional material and a polymer masterbatch. It can be directly applied to or added to other polymer materials for the purpose of manufacturing of a variety of products and is widely applied to various fields like electronics, electricity, instruments and meters, communication, culture and education, medical health service and daily life.

DETAILED DESCRIPTION OF THE EMBODIMENTS

Figure 1:
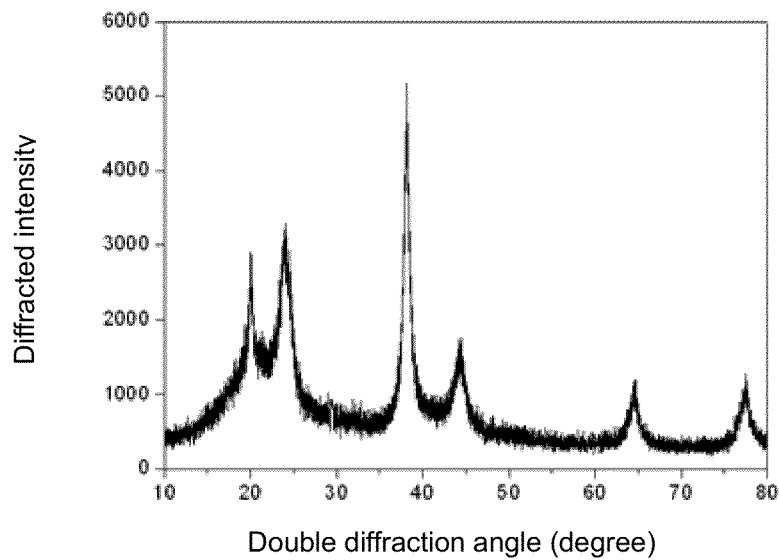
FIG. 1 illustrates an X-ray diffraction pattern of the nano Ag/nylon 6 composite material synthesized by the method of the embodiment 14.

Further description is made below to the invention with reference to the embodiments as shown in the drawings.

Embodiment 1

Preparation of a Nano $Mg(OH)_2$/Nylon 6 Composite Material

1. Use of the Precipitation Method for Preparing a Nano $Mg(OH)_2$/Caprolactam Mixture 1000 g $MgCl_2.6H_2O$ and 1000 g caprolactam having a purity not less than 60% and a moisture not more than 20% are added into a reactor, and then stirred for 30 min at 100° C., so that magnesium chloride is fully dissolved in a molten caprolactam mixture. 400 g NaOH is rapidly added under stirring, and then the temperature is constantly maintained at 100° C. for 2 h to obtain nano $Mg(OH)_2$/caprolactam mixture.

2. Polymerization of the Nano $Mg(OH)_2$/Caprolactam Mixture (1) The nano $Mg(OH)_2$/caprolactam mixture prepared in the previous step is added with 50 g deionized water, 1 g aminocaproic acid and 0.08 g molecular weight regulator, i.e. caproic acid, followed by uniform mixing under mechanical stirring at 80° C.

(2) A reactor is sealed and heated up to 240° C.; the vapor generation pressure is constantly maintained at 2.0 MPa, and hydrolysis reaction is performed for 16 h.

(3) The reactor is opened for pressure release in order to reach a standard atmospheric pressure; evacuation is performed for 5 h under stirring at 260° C.

(4) The nano $Mg(OH)_2$/nylon 6 composite material is obtained by discharging, strip pulling, cooling and pelletizing.

(5) The nano $Mg(OH)_2$/nylon 6 composite material is further cooked in water to remove monomer, oligomer and byproduct NaCl, and the refined nano $Mg(OH)_2$/nylon 6 composite material is obtained by full drying, and according to measurements, the yield and the weight average molecular weight Mw of nylon 6 are 70% and 30000, respectively. $Mg(OH)_2$ uniformly dispersed in the nano $Mg(OH)_2$/nylon 6 is composed of regular-hexagonal flaky nano particles having a thickness of about 10 nm and a length diameter of about 80 nm, and the measurement result of the flame retardant property of the composite material is Level V-0.

Embodiment 2

Preparation of a Nano $Mg(OH)_2$/Nylon 6 Composite Material

1. Use of the Precipitation Method for Preparing a Nano $Mg(OH)_2$/Caprolactam Mixture 1000 g $MgCl_2.6H_2O$ and 1000 g caprolactam having a purity not less than 60% and a moisture not more than 20% are added to a reactor, and then stirred for 30 min at the temperature of 80° C., so that magnesium chloride is fully dissolved in a molten caprolactam mixture. 400 g NaOH is rapidly added under stirring, and then the temperature is constantly maintained at 100° C. for 2 h to obtain nano $Mg(OH)_2$/caprolactam mixture.

2. Polymerization of the Nano Mg(OH)$_2$/Caprolactam Mixture (1) The nano Mg(OH)$_2$/caprolactam mixture prepared in the previous step is added with 5 g deionized water, 10 g aminocaproic acid and 0.08 g molecular weight regulator, i.e. caproic acid, followed by uniform mixing under mechanical stirring at the temperature of 80° C.

(2) A reactor is sealed and heated up to 240° C., the vapor generation pressure is constantly maintained at 1.2 MPa, and hydrolysis reaction is performed for 12 h.

(3) The reactor is opened for pressure release in order to reach a standard atmospheric pressure; evacuation is performed for 5 h under stirring at the temperature of 260° C.

(4) The nano Mg(OH)$_2$/nylon 6 composite material is obtained by discharging, strip pulling, cooling and pelletizing.

(5) The nano Mg(OH)$_2$/nylon 6 composite material is further cooked in water to remove monomer, oligomer and byproduct NaCl, and the refined nano Mg(OH)$_2$/nylon 6 composite material is obtained by full drying, and according to measurements, the yield and the weight average molecular weight Mw of nylon 6 are 80% and 30000, respectively. The Mg(OH)$_2$ uniformly dispersed in the nano Mg(OH)$_2$/nylon 6 is composed of regular-hexagonal flaky nano particles having a thickness of about 10 nm and a length diameter of about 75 nm.

Embodiment 3

Preparation of a Nano Nd(OH)$_3$/Nylon 6 Composite Material

1. Use of the Precipitation Method for Preparing a Nano Nd(OH)$_3$/Caprolactam Mixture 10.9 g Nd(NO$_3$)$_3$.6H$_2$O and 100 g caprolactam having a purity not less than 60% and a moisture not more than 20% are added to a reactor, and then stirred for 30 min at the temperature of 150° C., so that Nd(NO$_3$)$_3$.6H$_2$O is fully dissolved in a molten caprolactam mixture. 3 g NaOH is rapidly added under stirring for the purpose of reaction at 200° C. for 24 h to obtain nano Nd(OH)$_3$/caprolactam mixture.

2. Anionic Ring Opening Polymerization of the Nano Nd(OH)$_3$/Caprolactam Mixture The nano Nd(OH)$_3$/caprolactam mixture prepared in the previous step is water-removed by evacuation for 30 min at the temperature of 150° C., 1 g NaOH is added to continue evacuation for 30 min at the temperature of 150° C., 0.5 g toluene-2, 4-diisocyanate (TDI) is added after the temperature is lowered to 120° C., rapid and uniform mixing is performed within 30 s and then the mixture is transferred to a nitrogen-protecting mould for the purpose of polymerization reaction for 0.5 h at the temperature of 170° C. After the polymerization reaction is completed, the temperature is lowered to a room temperature and demoulding is performed to directly obtain a casting-type nano Nd(OH)$_3$/nylon 6 composite material, the yield of nylon 6 is 90%, and the average length and the diameter of the uniformly-dispersed bar-shaped Nd(OH)$_3$ nano materials are about 50 nm and about 9 nm, respectively.

3. Use of the Nano Nd(OH)$_3$/Nylon 6 Composite Material

The nano Nd(OH)$_3$/nylon 6 composite material is crushed and cooked in water at the temperature of 100° C. for 48 h, and then filtered and dried for 24 h at the temperature of 120° C. to obtain the purified nano particle/polyamide composite material, which is manufactured into a structural component by injection molding. The injection molding conditions are as follows: melting temperature: 235° C., injection pressure: 1000 bar, pressure maintaining time: 10 s and mould temperature: 50° C. The tested tensile strength and notched impact strength of a strip injection-molded according to U.S. ASTM standards are 80.2 kJ/m$^2$ and 9.5 kJ/m$^2$, respectively (the tensile and impact strengths are tested in accordance with ASTM-D638 and D6110 standards, respectively).

Embodiment 4

Preparation of a Nano ZnO/Nylon 6 Composite Material

1. Use of the Precipitation Method for Preparing a Nano ZnO/Caprolactam Mixture 3.4 g ZnCl$_2$ and 100 g caprolactam having a purity not less than 60% and a moisture not more than 20% are added to a reactor, and then stirred for 30 min at the temperature of 80° C., so that ZnCl$_2$ is fully dissolved in a molten caprolactam solvent. 2 g NaOH is rapidly added under stirring for the purpose of reaction at 100° C. for 2 h to obtain nano zinc oxide/caprolactam mixture.

2. Polymerization of the Nano ZnO/Caprolactam Mixture (1) The nano ZnO/caprolactam mixture prepared in the previous step is evacuated at the temperature of 150° C. for 1 h to fully remove water and low-boiling point impurities.

(2) 1 g caprolactam is added, and water is removed for 10 min by evacuation at the temperature of 150° C. so as to promote generation of anionic active species.

(3) The resultant product is transferred to a preheated mould, the temperature is constantly maintained at 200° C. for 8 h inside the sealed mould, and the nano ZnO/nylon 6 composite material is obtained by polymerization; the nylon 6 has a yield of 85% and the uniformly-dispersed nano ZnO has an average particle diameter of about 10 nm.

Embodiment 5

Preparation of a Nano ZnO/Nylon 6/12 Composite Material

1. Use of the Precipitation Method for Preparing a Nano ZnO/(Caprolactam+Urolactam) Mixture 3.41 g ZnCl$_2$ and mixed lactam composed of 80 g caprolactam and 20 g urolactam are added to a reactor and then stirred for 1 h at the temperature of 120° C., so that ZnCl$_2$ is fully dissolved in a molten mixed lactam solvent, wherein caprolactam and urolactam in the mixed lactam have a purity not less than 60% and a moisture not more than 20%. 2 g NaOH is rapidly added under stirring for the purpose of reaction at 160° C. for 2 h to obtain nano zinc oxide/(caprolactam+urolactam) mixture.

2. Anionic Polymerization of the Nano ZnO/(Caprolactam+Urolactam) Mixture

The nano ZnO/(caprolactam+urolactam) mixture prepared in the previous step is water-removed by evacuation for 30 min at the temperature of 150° C., 1 g NaOH is added to continue evacuation for 30 min at the temperature of 150° C., 1 g toluene-2, 4-diisocyanate (TDI) is added after the temperature is lowered to 120° C., rapid and uniform mixing is performed within 30 s and then the mixture is transferred to a nitrogen-protecting mould for the purpose of polymerization reaction for 0.5 h at the temperature of 170° C. After the polymerization reaction is completed, the temperature is lowered to a room temperature and demoulding is performed to directly obtain a casting-type nano ZnO/nylon 6/12 composite material. The polyamide matrix in the nano composite material is a copolymer of caprolactam and urolactam, and ZnO nano particles having a diameter of about 15 nm are uniformly dispersed in the nylon 6/12 polymer matrix.

Embodiment 6

Preparation and Use of a Nano $Fe_2O_3$/Nylon 6 Composite Material

1. Use of the Sol-Gel Method for Preparing a Nano $Fe_2O_3$/Caprolactam Mixture 82.5 g $ZnCl_2$ and 1000 g caprolactam having a purity not less than 95% and a moisture not more than 1% are added to a reactor, and then stirred for 30 min at the temperature of 80° C., so that $FeCl_3 \cdot 6H_2O$ is fully dissolved in a molten caprolactam solvent. 50 g deionized water is added for the purpose of hydrolysis reaction at 100° C. for 24 h, the water is removed by evacuation, and then the resultant product is subjected to gelation at the temperature of 180° C. for 8 h to obtain nano $Fe_2O_3$/caprolactam mixture.

2. Preparation of a Nano $Fe_2O_3$/Nylon 6 Composite Material by Anionic Polymerization Extrusion (1) The nano $Fe_2O_3$/caprolactam mixture prepared in the previous step is evacuated at the temperature of 100° C. for 2 h to fully remove water and low-boiling point impurities.

(2) 10 g NaOh is added, and water is removed for 2 h by evacuation at the temperature of 160° C. so as to promote generation of caprolactam anionic active species.

(3) The temperature is lowered to 80° C., 50 g toluene-2,4-diisocyanate (TDI) is added, uniform mixing is performed, the mixture is added to a double-screw extruder at a speed of 20 g/min for reactive extrusion so that a nano $Fe_2O_3$/nylon 6 composite material is prepared. The temperatures of the reaction extruder screws are as follows: 80° C. for area I, 160° C. for area II, 200° C. for area III, 250° C. for area IV, 250° C. for area V, 250° C. for area VI and 220° C. for area VII, and the rotating speed of the screws is 300 r/min.

(4) In the particle-like nano $Fe_2O_3$/nylon 6 composite material obtained by reactive extrusion, nano $Fe_2O_3$ is hematite with low degree of crystallinity and has an average particle diameter of 4 nm; the yield and weight average molecular weight Mw of nylon 6 are 95% and 100000.

3. Use of the Ano $Fe_2O_3$/Nylon 6 Composite Material as a Color Masterbatch (1) The particle-like nano $Fe_2O_3$/nylon 6 composite material obtained by reactive extrusion is cooked in water at the temperature of 80° C. for 12 h to remove monomer and byproducts, and then dried at the temperature of 100° C. for 24 h to obtain nano $Fe_2O_3$/nylon 6 composite material product. The nano $Fe_2O_3$/nylon 6 composite material product is composed of 4.8 parts by weight of nano $Fe_2O_3$ and 95.2 parts by weight of nylon 6 matrix, and has an appearance of scarlet particles and a melt index MI of 13.

(2) 10 g nano $Fe_2O_3$/nylon 6 composite material product and 1000 g commercial nylon 6 (mark number: DSMK222-KGV4/A) are fully mixed and added to a double-screw extruder for melting and blending, thus bright red particles are obtained and then directly molded into a red nylon 6 workpiece. The temperatures of the screws of the double-screw extruder are as follows: 220° C. for area I, 235° C. for area II, 235° C. for area III, 240° C. for area IV, 240° C. for area V, 240° C. for area VI and 220° C. for area VII, and the rotating speed of the screws is 500 r/min. The workpiece having the nano $Fe_2O_3$/nylon 6 composite material product as the color masterbatch for color mixing is even in color, full in color shade and stable in color, and addition of the color masterbatch imposes no influence to the mechanical performance of the material, the tensile strength and the notched impact strength can still be kept at 69.5 $kJ/m^2$ and 11.2 $J/m^2$ (respectively in accordance with ASTM-D638 and D6110 standard test results).

Embodiment 7

Preparation and Use of a Nano $SiO_2$/Nylon 6 Composite Material

1. Use of the Sol-Gel Method for Synthesizing a Nano $SiO_2$/Caprolactam Mixture 6 g ethyl orthosilicate and 100 g caprolactam having a purity not less than 60% and a moisture not more than 30% are added to a reactor, and then stirred for 30 min at the temperature of 150° C., so that ethyl orthosilicate is fully dissolved in a molten caprolactam solvent. 2 g deionized water is added for the purpose of hydrolysis reaction at 120° C. for 5 h, the water is removed by evacuation, and then the resultant product is subjected to gelation at the temperature of 200° C. for 24 h to obtain nano $SiO_2$/caprolactam mixture, wherein the particle diameter of nano $SiO_2$ is 23 nm.

2. Anionic Polymerization of the Nano $SiO_2$/Caprolactam Mixture (1) The nano $SiO_2$//caprolactam mixture prepared in the previous step is evacuated at the temperature of 150° C. for 1 h to fully remove water and low-boiling point impurities.

(2) 0.8 g sodium alcoholate is added, and water is removed for 10 min by evacuation at the temperature of 100° C. so as to promote generation of anionic active species.

(3) The temperature is lowered to 120° C., 0.1 g toluene-2,4-diisocyanate (TDI) is added, rapid and uniform mixing is performed, the mixture is transferred to a preheated mould, the temperature is constantly maintained at 150° C. for 1 h, and a casting-type nano $SiO_2$/nylon 6 composite material is obtained by demoulding; the nylon 6 has a yield of 98% and the uniformly-dispersed nano ZnO has an average particle diameter of about 30 nm.

3. Use of the Nano $SiO_2$/Nylon 6 Composite Material

The casting-type nano $SiO_2$/nylon 6 composite material can be directly applied to a structural part and is suitable for use for stressed and wear-resistant components, especially for industrial cart roller wheel and luggage roller wheel, and the wear resistance of the resultant product is improved by 30% compared with common casting-type nylon 6.

Embodiment 8

Preparation and Use of a Nano $TiO_2$/Nylon 6 Composite Material

1. Use of the High-Temperature Pryolysis Method for Synthesizing a Nano $TiO_2$/Caprolactam Mixture 10 g titanium tetrachloride (moisture<10%), 14 g trioctylphosphine oxide (anion $O^{2-}$ donor) and 1000 g caprolactam having a purity not less than 99.5% and a moisture less than 0.01% are added to a reactor, and then stirred for 30 min at the temperature of 80° C., so that titanium tetrachloride and trioctylphosphine oxide are fully dissolved in a molten caprolactam solvent. The temperature is raised to 270° C., and hydrolysis reaction is performed for 2 h to obtain nano $TiO_2$/caprolactam mixture.

2. Hydrolysis and Polymerization of the Nano $TiO_2$/Caprolactam Mixture (1) The nano $TiO_2$/caprolactam mixture prepared in the previous step is added with 50 g deionized water, 10 g aminocaproic acid and 0.1 g caproic acid, followed by uniform mixing under mechanical stirring at the temperature of 80° C.

(2) A reactor is sealed and heated up to 240° C., the vapor generation pressure is constantly maintained at 2.0 MPa, and hydrolysis reaction is performed for 16 h.

(3) The reactor is opened for pressure release in order to reach a standard atmospheric pressure; evacuation is performed for 5 h under stirring at the temperature of 260° C.

(4) The nano $TiO_2$/nylon 6 composite material is obtained by discharging, strip pulling, cooling and pelletizing, and according to measurements, the yield and the weight average molecular weight Mw of nylon 6 are 70% and 20000, respectively. The uniformly-dispersed $TiO_2$ is an anatase crystal form, and has a crystal grain diameter of about 5 nm.

3. Use of the Nano $TiO_2$/Nylon 6 Composite Material (1) The nano $TiO_2$/nylon 6 composite material is cooled in water for 24 h at the temperature of 80° C. to remove monomer, oligomer and byproducts, and then dried for 24 h at the temperature of 120° C. to obtain a refined nano $TiO_2$/nylon 6 composite material.

(2) The nano $TiO_2$/nylon 6 composite material is manufactured into a structural part by injection molding. The injection molding conditions are as follows: melting temperature: 235° C., injection pressure: 1000 bar, pressure maintaining time: 10 s and mould temperature: 50° C. The tested tensile strength and notched impact strength of a strip injection-molded according to U.S. ASTM standards are 60.8 $kJ/m^2$ and 6.4 $kJ/m^2$, respectively (the tensile and impact strengths are tested in accordance with ASTM-D638 and D6110 standards, respectively). In addition, the composite material has a quite strong ultraviolet absorption performance, especially for light with 200-500 nm wavelength; and it shows excellent light aging resistance, as a result, the surface of a product is not obviously darkened even if the product is subjected to accelerated aging for 30 days in an ultraviolet accelerated aging oven under such conditions as 50° C., 60 humidity and 300 nm wavelength.

Embodiment 9

Preparation of a Nano ZnS/Nylon 6 Composite Material

1. Use of the Precipitation Method for Preparing a Nano ZnS/Caprolactam Mixture 10 g $ZnCl_2$ and 100 g caprolactam having a purity not less than 80% and a moisture not more than 20% are added to a reactor, and then stirred for 30 min at the temperature of 100° C., so that $ZnCl_2$ is fully dissolved in a molten caprolactam solvent. 12 g $Na_2S.9H_2O$ is rapidly added under stirring for the purpose of reaction at 150° C. for 12 h to obtain nano ZnS/caprolactam mixture, and nano ZnS is a spherical particle and has a particle diameter of about 20 nm.

2. Anionic Polymerization of the Nano ZnS/Caprolactam Mixture (1) The nano ZnS/caprolactam mixture prepared in the previous step is evacuated at the temperature of 150° C. for 1 h to fully remove water and low-boiling point impurities.

(2) 1 g sodium caprolactam is added, and water is removed for 10 min by evacuation at the temperature of 150° C. so as to promote generation of anionic active species.

(3) The temperature is lowered to 120° C., 0.1 g toluene-2, 4-diisocyanate (TDI) is added, rapid and uniform mixing is performed, the mixture is transferred to a preheated mould, the temperature is constantly maintained at 150° C. for 1 h, and a casting-type nano ZnS/nylon 6 composite material is obtained by demoulding; the nylon 6 has a yield of 96% and the uniformly-dispersed nano ZnS has an average particle diameter of about 25 nm.

Embodiment 10

Preparation of a Nano CdTe/Nylon 6 Composite Material

1. Use of the Precipitation Method for Synthesizing a Nano CdTe/Caprolactam Mixture 0.82 g $Cd(NO_3)_2.2H_2O$, 0.54 g 2-mercaptopropionic acid (stabilizing agent) and 100 g caprolactam having a purity not less than 90% and a moisture not more than 1% are added to a reactor, and then stirred for 30 min at the temperature of 80° C., so that $Cd(NO_3)_2.2H_2O$ and 2-mercaptopropionic acid are fully dissolved in a molten caprolactam solvent. 0.5 g NaHTe is rapidly added under the protection of nitrogen, and then the temperature is maintained constantly at 90° C. for 4 h to obtain nano CdTe/caprolactam mixture.

2. Anionic Polymerization of the Nano CdTe/Caprolactam Mixture (1) The nano CdTe/caprolactam mixture prepared in the previous step is evacuated at the temperature of 150° C. for 1 h to fully remove water and low-boiling point impurities.

(2) 1 g sodium caprolactam is added, and water is removed for 10 min by evacuation at the temperature of 150° C. so as to promote generation of anionic active species.

(3) The temperature is lowered to 120° C., 0.1 g toluene-2, 4-diisocyanate (TDI) is added, rapid and uniform mixing is performed, the mixture is transferred to a preheated mould, the temperature is constantly maintained at 150° C. for 1 h, and a casting-type nano CdTe/nylon 6 composite material is obtained by demoulding; the nylon 6 has a yield of 92% and the uniformly-dispersed nano CdTe has an average particle diameter of about 12 nm.

Embodiment 11

Preparation of a Nano $MgCO_3$/Nylon 12 Composite Material

1. Use of the Precipitation Method for Synthesizing a Nano MgCO3/Urolactam Mixture 20.3 g $MgCl_2.6H_2O$ and 100 g urolactam having a purity not less than 80% and a moisture not more than 10% are added to a reactor, and then stirred for 30 min at the temperature of 120° C., so that magnesium chloride is fully dissolved in a molten urolactam solvent. 15 g $Na_2CO_3$ is rapidly added under stirring for the purpose of reaction for 24 h at the temperature of 120° C., so as to obtain nano $MgCO_3$/urolactam mixture, and the nano $MgCO_3$ has a flaky structure, a thickness of about 5 nm and a length diameter of about 60 nm.

2. Anionic Polymerization of the Nano $MgCO_3$/Urolactam Mixture (1) The nano $MgCO_3$caprolactam mixture prepared in the previous step is evacuated at the temperature of 120° C. for 1 h to fully remove water and low-boiling point impurities.

(2) 1 g sodium caprolactam is added, and water is removed for 10 min by evacuation at the temperature of 150° C. so as to promote generation of anionic active species.

(3) The temperature is lowered to 120° C., 0.1 g N-acetyl-caprolactam is added, rapid and uniform mixing is performed, the mixture is transferred to a preheated mould, the temperature is constantly maintained at 150° C. for 1 h, and a casting-type nano $MgCO_3$/nylon 6 composite material is obtained by demoulding; the nylon 12 has a yield of 89%.

Embodiment 12

Preparation of a Nano $BaSO_4$/Nylon 6 Composite Material

1. Use of the Precipitation Method for Synthesizing a Nano $BaSO_4$/Caprolactam Mixture 5.6 g $BaCl_2$ and 100 g caprolactam having a purity not less than 80% and a moisture not more than 20% are added to a reactor, and then stirred for 30 min at the temperature of 100° C., so that $BaCl_2$ is fully dissolved in a molten caprolactam solvent. 3 g $Na_2SO_4$ is rapidly added under stirring for the purpose of reaction for 24 h at the temperature of 100° C., so as to obtain nano $BaSO_4$/caprolactam mixture.

2. Anionic Polymerization of the Nano $BaSO_4$/Caprolactam Mixture (1) The nano $BaSO_4$/caprolactam mixture prepared in the previous step is evacuated at the temperature of 120° C. for 1 h to fully remove water and low-boiling point impurities.

(2) 1 g sodium caprolactam is added, and water is removed for 10 min by evacuation at the temperature of 150° C. so as to promote generation of anionic active species.

(3) The temperature is lowered to 120° C., 0.1 g toluene-2, 4-diisocyanate (TDI) is added, rapid and uniform mixing is performed, the mixture is transferred to a preheated mould, the temperature is constantly maintained at 150° C. for 1 h, and a casting-type nano $BaSO_4$/nylon 6 composite material is obtained by demoulding; the nylon 6 has a yield of 99.5%.

Embodiment 13

Preparation of a Nano AgCl/Nylon 6 Composite Material

1. Use of the Precipitation Method for Synthesizing a Nano AgCl/Caprolactam Mixture 2.1 g $AgNO_3$ and 100 g caprolactam having a purity not less than 80% and a moisture not more than 20% are added to a reactor, and then stirred for 30 min at the temperature of 100° C., so that silver nitrate is fully dissolved in a molten caprolactam solvent. 1.5 g NaCl is rapidly added under stirring for the purpose of reaction for 24 h at the temperature of 100° C., so as to obtain nano AgCl/caprolactam mixture.

2. Anionic Polymerization of the Nano AgCl/Caprolactam Mixture (1) The nano AgCl/caprolactam mixture prepared in the previous step is evacuated at the temperature of 150° C. for 1 h to fully remove water and low-boiling point impurities.

(2) 1 g sodium caprolactam is added, and water is removed for 10 min by evacuation at the temperature of 150° C. so as to promote generation of anionic active species.

(3) The temperature is lowered to 120° C., 0.1 g toluene-2, 4-diisocyanate (TDI) is added, rapid and uniform mixing is performed, the mixture is transferred to a preheated mould, the temperature is constantly maintained at 150° C. for 1 h, and a casting-type nano AgCl/nylon 6 composite material is obtained by demoulding; the nylon 6 has a yield of 99.8%, and AgCl having a particle diameter of 4 nm is uniformly dispersed in a nylon 6 matrix.

Embodiment 14

Preparation and Use of a Nano Ag/Nylon 6 Composite Material

1. Use of the Precipitation Method for Synthesizing a Nano Ag/Caprolactam Mixture 4.24 g $AgNO_3$ and 100 g molten caprolactam having a purity not less than 60% and a moisture not more than 20% are added to a reactor, and then stirred for 30 min at the temperature of 100° C., so that $AgNO_3$ is fully dissolved in a molten caprolactam solvent. 1 g NaOH and 2 ml hydroxylamine are rapidly added under stirring for the purpose of reaction for 2 h at the temperature of 100° C., so as to obtain nano Ag/caprolactam mixture.

2. Anionic Polymerization of the Nano Ag/Caprolactam Mixture

The nano Ag/caprolactam mixture prepared in the previous step is evacuated for 30 min at the temperature of 150° C. in order to remove low-melting point byproducts. 1 g NaOH is added for continuos evacuation for 30 min at the temperature of 150° C., 0.5 g toluene-2, 4-diisocyanate (TDI) is added after the temperature is lowered to 140° C., rapid and uniform mixing is performed within 30 s and then the mixture is transferred to a nitrogen-protecting mould for the purpose of polymerization reaction for 0.5 h at the temperature of 170° C. After the polymerization reaction is completed, the temperature is lowered to a room temperature and demoulding is performed to directly obtain a casting-type nano Ag/nylon 6 composite material, the yield of nylon 6 is 95%.

Figure 2:
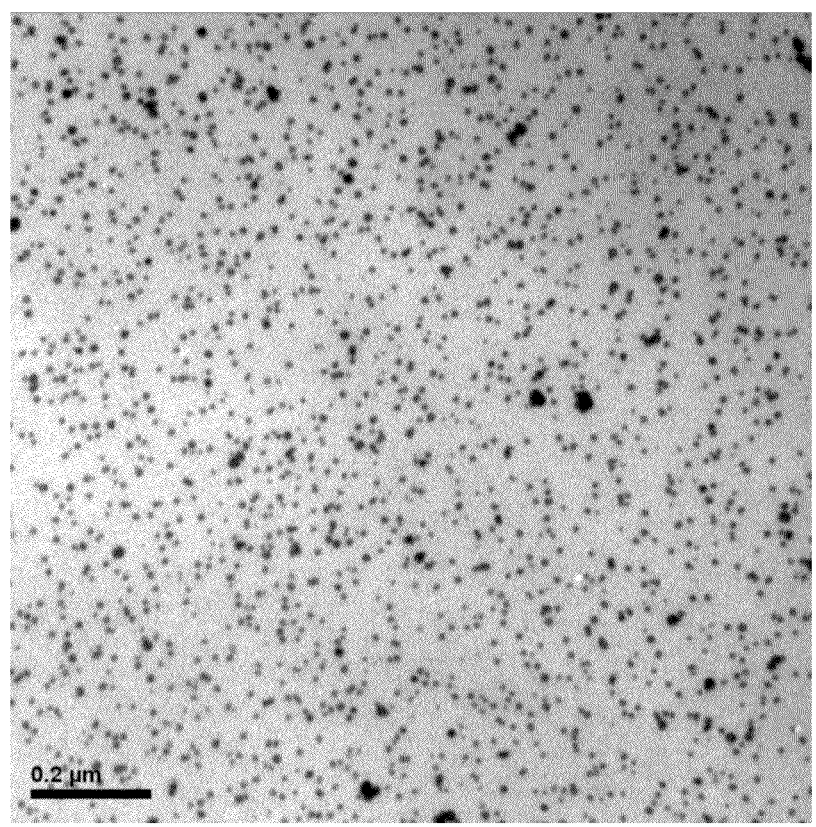
FIG. 2 illustrates a schematic diagram, under a transmission electron microscope (TEM), of the nano Ag/nylon 6 composite material synthesized by the method of embodiment 14 after ultrathin cryosectioning.

FIG. 1 is an X-ray diffraction (XRD) pattern of the nano Ag/nylon 6 composite material synthesized by the method in this embodiment, diffraction peaks when double diffraction angles 2θ are equal to 20.1° and to 24.0° are consistent with that of α-crystal form nylon 6; diffraction peaks when the double diffraction angles 2θ are equal to 38.2°, 44.3°, 64.5° and 77.5° are matched with silver of a cubic crystal form; this indicates that the composite material is composed of Ag and nylon 6. FIG. 2 is a diagram, under a transmission electron microscope (TEM), of the nano Ag/nylon 6 composite material synthesized by the method in this embodiment after ultrathin cryosectioning, and the observation result shows that Ag nano particles having an average particle diameter of about 6 nm are quite uniformly dispersed in a nylon 6 matrix.

3. Use of the Nano Ag/Nylon 6 Composite Material as a Functional Polymer (1) The casting-type nano Ag/nylon 6 composite material is crushed and then extracted with water at the temperature of 100° C. for 12 h to remove unpolymerized polymer monomer, oligomer and soluble organic salts, the resultant product is fully dried at the temperature of 100° C. to obtain a refined particle-like nano Ag/nylon 6 composite material.

(2) The composite material can be manufactured into antibacterial and antistatic fiber by means of melt spinning. The spinning conditions are as follows: melting temperature: 240° C., spinning head temperature: 275° C., pressure: 3.0 MPa and air cooling temperature at outlet: 20° C. The resultant nano Ag/nylon 6 fiber having the antibacterial function has a diameter of μm, and the antibacterial rate is more than 99.9% by a test in accordance with AATCC-100 standards; the antibacterial rate of the sample can still be maintained to be more than 99.9% even if the sample is cooked in water at the temperature of 80° C. for 8 h, then dried at the temperature of 80° C. for 16 h and circularly subjected to the above treatments 10 times.

4. Use of the Nano Ag/Nylon 6 Composite Material as an Antibacterial Masterbatch (1) The casting-type Ag/nylon 6 composite material is crushed and then extracted with water at the temperature of 80° C. for 12 h to remove unpolymerized polymer monomer, oligomer and soluble organic salts, the resultant product is fully dried at the temperature of 120° C. to obtain a high-quality particle-like nano Ag/nylon 6 composite material.

(2) 20 g particle-like nano Ag/nylon 6 composite material prepared in this embodiment and 2000 g industrial-grade nylon 6 (mark number: DSMK222-KGV4/A) are molten and blended, the processing temperature is from 220° C. to 240° C., and the rotating speed of screws is 500 r/min. The plastic product is tested in accordance with *JIS Z 2801-2010 Antibacterial Fabricated Product—Antibacterial Property Test Method*, and the test result shows that the antibacterial activity of the plastic product against *Escherichia coli* and staphylococci *aureus* reaches the highest level (more than 5), i.e. the antibacterial rate is more than 99.9%.

Embodiment 15

Preparation and Use of a Nano-Plated Ag Glass Microsphere/Nylon 6 Composite Material 1. Use of the Precipitation Method for Synthesizing a Nano-Plated Ag Glass Microsphere/Caprolactam Mixture 17.0 g $AgNO_3$, 10 g glass microsphere (having an average diameter of about 15 um) and caprolactam having a purity not less than 80% and a moisture not more than 20% are added to a reactor, and then stirred for 1 h at the temperature of 100° C., so that glass microsphere and $AgNO_3$ are fully dispersed/dissolved in a molten caprolactam solvent. 4 g NaOH and 8 g glucose are rapidly added under stirring for the purpose of reaction for 12 h at the temperature of 100° C., so as to obtain nano-plated Ag glass microsphere/caprolactam mixture.

1. Anionic Polymerization of the Nano-Plated Ag Glass Microsphere/Caprolactam Mixture (1) The nano Ag glass microsphere/caprolactam mixture prepared in the previous step is evacuated at the temperature of 150° C. for 1 h to fully remove water and low-boiling point impurities.

(2) 1 g sodium caprolactam is added, and water is removed for 10 min by evacuation at the temperature of 150° C. so as to promote generation of anionic active species.

(3) The temperature is lowered to 120° C., 0.1 g toluene-2,4-diisocyanate (TDI) is added, rapid and uniform mixing is performed, the mixture is transferred to a preheated mould, the temperature is constantly maintained at 150° C. for 2 h, and a casting-type nano-plated Ag glass microsphere/nylon 6 composite material is obtained by demoulding; the nylon 6 has a yield of 91.5%, the average thickness of a nano silver layer on the surface of the glass microspheres is 20 nm, and the silver-plated glass microspheres are uniformly dispersed in a nylon 6 matrix.

3. Use of the Nano-Plated Ag Glass Microsphere/Nylon 6 Composite Material as a Polymer Having Conductive/Electromagnetic Shielding Functions (1) The casting-type nano-plated Ag glass microsphere/nylon 6 composite material is crushed and then extracted with water for 12 h to remove unpolymerized polymer monomer, oligomer and soluble organic salts, the resultant product is fully dried at the temperature of 120° C. to obtain a high-quality particle-like nano Ag/nylon 6 composite material.

(2) The particle-like nano-plated Ag glass microsphere/nylon 6 composite material is manufactured, by injection molding, into a rectangular sample that is 110 mm long, 50 mm wide and 2 mm thick. The measured volume resistance of the composite material is $1.5 \times 10^3$ Ω·cm in accordance with a GB3048.3-2007 semi-conductive rubber-plastic material volume resistivity test.

Embodiment 16

Preparation and Use of a Nano Pd/Nylon 6 Composite Material

1. Use of the Precipitation Method for Preparing a Nano Pd/Caprolactam Mixture 5.0 g $PdCl_2$ and 100 g molten caprolactam having a purity not less than 80% and a moisture not more than 20% are added to a reactor, and then stirred for 30 min at the temperature of 100° C., so that $PdCl_2$ is fully dissolved in a molten caprolactam solvent. 1 g NaOH is rapidly added under stirring for the purpose of reaction for 2 h at the temperature of 100° C., and then, 2 g $KBH_4$ is added for continuous reaction for 2 h to obtain nano Pd/caprolactam mixture.

2. Anionic Polymerization of the Nano Pd/Caprolactam Mixture (1) The nano Pd/caprolactam mixture prepared in the previous step is evacuated at the temperature of 150° C. for 1 h to fully remove water and low-boiling point impurities.

(2) 1 g sodium caprolactam is added, and water is removed for 10 min by evacuation at the temperature of 150° C. so as to promote generation of anionic active species.

(3) The temperature is lowered to 120° C., 0.1 g toluene-2,4-diisocyanate (TDI) is added, rapid and uniform mixing is performed, the mixture is transferred to a preheated mould, the temperature is constantly maintained at 150° C. for 1 h, and a casting-type nano Pd/nylon 6 composite material is obtained by demoulding; the nylon 6 has a yield of 95.5%, and the nano Pd having an average particle diameter of 6 nm is uniformly dispersed in a nylon 6 matrix.

3. Use of the Nano Pd/Nylon 6 Composite Material as a Catalyst (1) The casting-type nano Pd/nylon 6 composite material is crushed and then extracted with water for 12 h to remove unpolymerized polymer monomer, oligomer and soluble organic salts, the resultant product is fully dried at the temperature of 120° C. to obtain a high-quality particle-like nano Pd/nylon 6 composite material.

(2) The particle-like nano Pd/nylon 6 composite material is manufactured, by melt spinning, into fiber having a diameter of 50 μm, so as to obtain a nano Pd/nylon 6 composite catalyst.

(3) The nano Pd/nylon 6 composite catalyst is applied to a model reaction for preparing phenylpropyl aldehyde by hydrogenation of cinnamic aldehyde, the reaction temperature is 50° C., the hydrogen partial pressure is 0.2 MPa and the addition amount of the catalyst is 2%, and 12 h later, the reaction is completed, the conversion rate of the cinnamic aldehyde is 90% and the selectivity for the product phenylpropyl aldehyde is 98%. In addition, the fibrous nano Pd/nylon 6 composite catalyst is convenient for separation and recyclable; the catalytic conversion rate and the selectivity can still be maintained to be over 80% and to be not less than 90% respectively even if the catalyst has been used 10 times.

Embodiment 17

Preparation of a Nano $Fe_3O_4$/Nylon 6 Composite Material (1) A three-neck with the volume of 250 ml is fixed inside a heating jacket, a thermometer, an air condensing tube and a nitrogen feeding joint are respectively arranged on the three necks, and an evacuation device joint is connected with the condensing tube from above to ensure excellent airtightness of the entire device. 100 g caprolactam, 3.2 g $FeCl_2.4H_2O$ and 6.5 g $FeCl_3.6H_2O$ are weighed and added to the flask, the flask is evacuated, nitrogen is fed into the flask to remove oxygen three times, afterwards, the temperature is raised to the melting point 80° C. of the caprolactam and maintained for 30 min, so that $FeCl_2.4H_2O$ and $FeCl_3.6H_2O$ are fully dissolved in the caprolactam to form a dark brown solution.

(2) Water and impurities are removed from the $FeCl_2.4H_2O$ and $FeCl_3.6H_2O$/caprolactam solution. The solution prepared in the step (1) is evacuated at the temperature of 150° C. and subjected to refluxing treatment for 20 min in the air condensing tube, so as to remove the small amount of water and low-boiling point impurities contained in the raw material.

(3) A $Fe_3O_4$ nano magnetic particle/caprolactam magnetic fluid is prepared. The $FeCl_2.4H_2O$ and $FeCl_3.6H_2O$/caprolactam solution, from which water is fully removed in the step (2), is fed with nitrogen to reach a standard atmospheric pressure, the temperature is lowered to 90° C., 5 g NaOH powder is added and the solution is rapidly sealed, the solution is evacuated and the temperature is raised to 150° C., and refluxing treatment is performed for 1.5 h in the air condensing tube to obtain nano $Fe_3O_4$/caprolactam mixture.

(4) In-situ anionic ring opening polymerization of the nano $Fe_3O_4$/caprolactam mixture. Nitrogen is fed into the system to reach a standard atmospheric pressure, 0.5 g toluene-2, 4-diisocyanate (TDI) is added at the temperature of 150° C., rapid and uniform mixing is performed within 30 s and then the mixture is transferred to a nitrogen-protecting mould for the purpose of polymerization reaction for 0.5 h at the temperature of 170° C. After the polymerization reaction is completed, the temperature is lowered to a room temperature and demoulding is performed to directly obtain nano $Fe_3O_4$/nylon 6 composite material-made structural component, which can be applied to a variety of fields.

(5) The material prepared in the step (4) is crushed and then extracted with water for 12 h to remove unpolymerized polymer monomer, oligomer and soluble organic salts, the resultant product is fully dried at the temperature of 120° C. to obtain high-quality $Fe_3O_4$/nylon 6 composite material, and the purified composite material can be applied to such fields as medical heath service, food package, etc.

Figure 3:
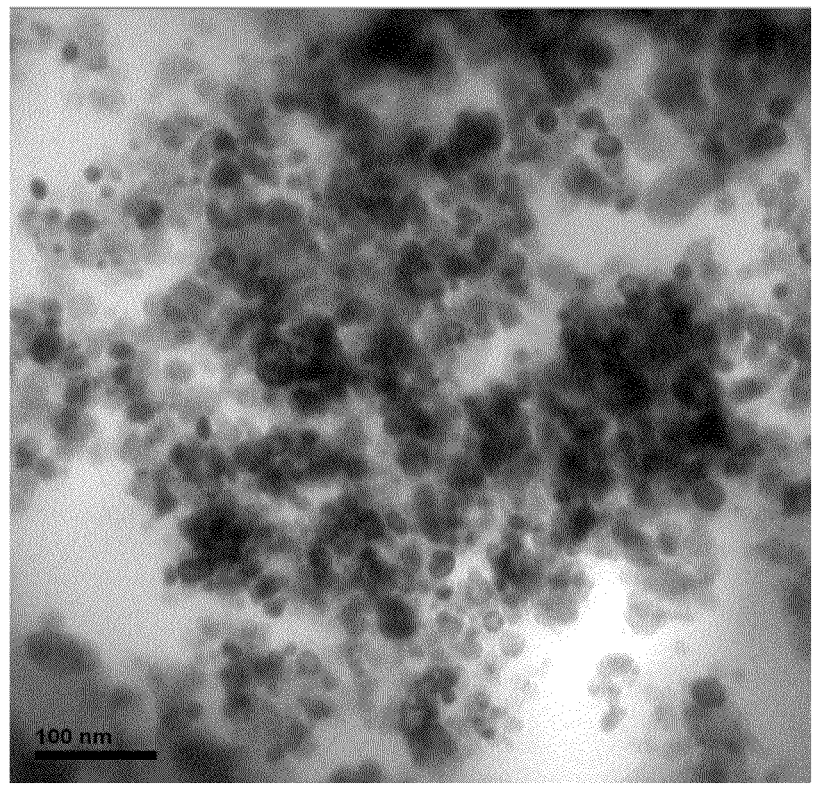
FIG. 3 illustrates a schematic diagram, under a transmission electron microscope (TEM), of the nano $Fe_3O_4$/nylon 6 composite material synthesized by the method of embodiment 17 after ultrathin cryosectioning.
Figure 4:
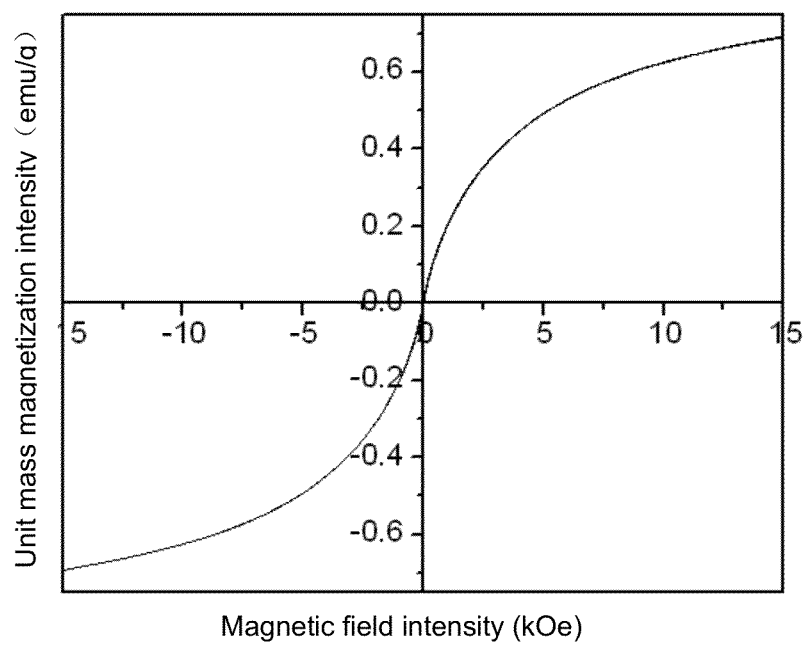
FIG. 4 illustrates a schematic diagram of a magnetization curve of the nano $Fe_3O_4$/nylon 6 composite material synthesized by the method of embodiment 17, which is measured using a vibration sample magnetometer (VSM).

The yield of the nylon 6 is 98% by calculation based on the amount of extracted unpolymerized polymer monomer and oligomer. FIG. 3 is a diagram, under a transmission electron microscope (TEM), of the nano $Fe_3O_4$/nylon 6 composite material synthesized by the method in this embodiment after ultrathin cryosectioning, and the observation result shows that $Fe_3O_4$ particles having an average particle diameter of about 10 nm are uniformly dispersed in a nylon 6 matrix. FIG. 4 illustrates a magnetization curve of the nano $Fe_3O_4$/nylon 6 composite material synthesized by the method in this embodiment, which is measured using a vibration sample magnetometer (VSM), and coincidence of the magnetization curve and a demagnetization curve indicates that the composite material has superparamagnetism; the saturation magnetization is 0.8 emu/g, in addition, the composite material is magnetically stable for a long time in an air atmosphere lower than 80° C.; the polymer matrix nylon 6 having a number average molecular weight of about 100000 is suitable for use in such fields as electromagnetic shielding, magnetic separation, etc.

Embodiment 18

Preparation of a Nano Ag/Nylon 6 Composite Material

1. Use of the High-Temperature Pyrolysis Method for Preparing a Nano Ag/Caprolactam Mixture 4.24 g $AgNO_3$ and 100 g caprolactam having a purity not less than 99.5% and a moisture not more than 0.01% are added to a reactor, and then stirred for 30 min at the temperature of 80° C., so that $AgNO_3$ is fully dissolved in a molten caprolactam solvent, 5 g glucose is rapidly added and heated up to 200° C. for the purpose of pyrolytic reaction for 12 h, so as to obtain nano Ag/caprolactam mixture.

2. Anionic Polymerization of the Nano Ag/Caprolactam Mixture (1) The nano Ag/caprolactam mixture prepared in the previous step is evacuated at the temperature of 150° C. for 1 h to fully remove water and low-boiling point impurities.

(2) 1 g sodium caprolactam is added, and water is removed for 10 min by evacuation at the temperature of 150° C. so as to promote generation of anionic active species.

(3) The temperature is lowered to 120° C., 0.1 g toluene-2, 4-diisocyanate (TDI) is added, rapid and uniform mixing is performed, the mixture is transferred to a preheated mould, the temperature is constantly maintained at 180° C. for 1 h, and a casting-type nano Ag/nylon 6 composite material is obtained by demoulding; the nylon 6 has a yield of 91.6%, and Ag having a particle diameter of 3 nm is uniformly dispersed in a nylon 6 matrix.

Embodiment 19

Preparation of a Nano $Fe_3O_4$/Nylon 6 Composite Material

1. Use of the Sol-Gel Method for Preparation a Nano $Fe_3O_4$/Caprolactam Mixture 2.7 g $FeCl_3.6H_2O$ and 100 g caprolactam having a purity not less than 60% and a moisture not more than 30% are added to a reactor, and then stirred for 30 min at the temperature of 120° C., so that $FeCl_3.6H_2O$ is fully dissolved in a molten caprolactam solvent, 2 g deionized water is added for hydrolysis reaction for 24 h at the temperature of 120° C., 5 g potassium borohydride is added after the water is removed by evacuation, the resultant product is subjected to gelation at the temperature of 200° C. for 5 h to obtain nano $Fe_3O_4$/caprolactam mixture.

2. Anionic Polymerization of the Nano $Fe_3O_4$/Caprolactam Mixture (1) The nano $Fe_3O_4$/caprolactam mixture prepared in the previous step is evacuated at the temperature of 150° C. for 1 h to fully remove water and low-boiling point impurities.

(2) 0.8 g sodium alcoholate is added, and water is removed for 30 min by evacuation at the temperature of 100° C. so as to promote generation of anionic active species.

(3) The temperature is lowered to 120° C., 0.1 g toluene-2, 4-diisocyanate (TDI) is added, rapid and uniform mixing is performed, the mixture is transferred to a preheated mould, the temperature is constantly maintained at 150° C. for 1 h, and a casting-type nano $Fe_3O_4$/nylon 6 composite material is obtained by demoulding; the nylon 6 has a yield of 92.5%, and the uniformly-dispersed nano $Fe_3O_4$ has an average particle diameter of about 40 nm.

Embodiment 20

1. Use of the Precipitation Method for Synthesizing a Nano Cu/Caprolactam Mixture 6.242 g $CuSO_4.5H_2O$, 5 g hexadecyl trimethyl ammonium bromide and 100 g caprolactam with a purity not less than 80% and a moisture not more than 20% are added to a reactor, and then stirred for 30 min at the temperature of 100° C., so that $CuSO_4.5H_2O$ and hexadecyl trimethyl ammonium are fully dissolved in a molten caprolactam solvent. 1 g NaOH is rapidly added under stirring, the temperature is constantly maintained for 2 h at the temperature of 120° C., and then 4 g ascorbic acid is added for continuous reaction for 2 h at the temperature of 120° C. so as to obtain nano Cu/caprolactam mixture.

2. Anionic Polymerization of the Nano Cu/Caprolactam Mixture (1) The nano Cu/caprolactam mixture prepared in the previous step is evacuated at the temperature of 150° C. for 1 h to fully remove water and low-boiling point impurities.

(2) 1.6 g sodium alcoholate is added, and water is removed for 30 min by evacuation at the temperature of 100° C. so as to promote generation of anionic active species.

(3) The temperature is lowered to 120° C., 0.1 g toluene-2,4-diisocyanate (TDI) is added, rapid and uniform mixing is performed, the mixture is transferred to a preheated mould, the temperature is constantly maintained at 150° C. for 1 h, and a casting-type nano Cu/nylon 6 composite material is obtained by demoulding; the nylon 6 has a yield of 82.5%, and nano Cu, which is a thread of 500×10 nm, is uniformly dispersed in a nylon 6 matrix.

Embodiment 21

Preparation of a $Mn_3O_4$/Casting Nylon 6 Magnetic Composite Polymer Material (1) A three-neck with the volume of 250 ml is fixed inside a heating jacket, a thermometer, an air condensing tube and a nitrogen feeding joint are respectively arranged on the three necks, and an evacuation device joint is connected with the condensing tube from above to ensure excellent airtightness of the entire device. 100 g caprolactam, 6.3 g $MnCl_2$ and 12.6 g $MnCl_3$ are weighed and added to the flask, the flask is evacuated, nitrogen is fed into the flask to remove oxygen three times, afterwards, the temperature is raised to 120° C. and maintained for 30 min, so that $MnCl_2$ and $MnCl_3$ are fully dissolved in the caprolactam.

(2) Water and impurities are removed from the $MnCl_2$ and $MnCl_3$/caprolactam solution. The solution prepared in the step (1) is evacuated at the temperature of 160° C. for 30 min to remove the small amount of water and low-boiling point impurities contained in the raw material.

(3) A $Mn_3O_4$ magnetic particle/caprolactam magnetic fluid is prepared. The $MnCl_2$ and $MnCl_3$/caprolactam solution, from which water is fully removed in the step (2), is fed with nitrogen to reach a standard atmospheric pressure, 7.5 g NaOH powder is added and the solution is rapidly sealed, the temperature is raised to 160° C., and the solution is evacuated for 2.5 h to obtain $Mn_3O_4$ magnetic particle/caprolactam magnetic fluid.

(4) In-situ polymerization of the $Mn_3O_4$ magnetic particle/caprolactam magnetic fluid. Nitrogen is fed into the system to reach a standard atmospheric pressure, 0.8 g toluene-2, 4-diisocyanate (TDI) is added at the temperature of 150° C., rapid and uniform mixing is performed within 30 s and then the mixture is transferred to a nitrogen-protecting mould for the purpose of polymerization reaction for 1.5 h at the temperature of 170° C. After the polymerization reaction is completed, the temperature is lowered to a room temperature and demoulding is performed to directly obtain $Mn_3O_4$/casting nylon 6 magnetic composite engineering plastic component, which can be applied to a variety of fields.

(5) The material prepared in the step (4) is crushed and then extracted with water for 14 h to remove unpolymerized polymer monomer, oligomer and soluble organic salts, the resultant product is fully dried at the temperature of 80° C. to obtain $Mn_3O_4$ magnetic particle nylon 6 composite polymer material, and the yield of polymer matrix nylon 6 is 92%. The purified composite material can be applied to the fields in which there is a high purity requirement, like medical magnetic polymer, and is favorable for subsequent treatment and shaping.

The particle diameter and content of the magnetic particles in the resultant composite material is about 60-170 nm and 11.2 wt % respectively, the saturation magnetization of the composite material is 1.2 emu/g, and the composite material is magnetically stable for a long time in an air atmosphere lower than 80° C.; the polymer matrix nylon 6 has a number average molecular weight of about 60000.

Embodiment 22

Preparation of a Nano $Fe_3O_4$/Nylon 4 Magnetic Composite Polymer Material (1) A three-neck with the volume of 250 ml is fixed inside a heating jacket, a thermometer, an air condensing tube and a nitrogen feeding joint are respectively arranged on the three necks, and an evacuation device joint is connected with the condensing tube from above to ensure excellent airtightness of the entire device. 100 g α-pyrrolidone, 6.4 g $FeCl_2.4H_2O$ and 13.0 g $FeCl_3.6H_2O$ are weighed and added to the flask, the flask is evacuated, nitrogen is fed into the flask to remove oxygen three times, afterwards, the temperature is raised 120° C. and maintained for 30 min, so that $FeCl_2.4H_2O$ and $FeCl_3.6H_2O$ are fully dissolved in the α-pyrrolidone to form a dark brown solution.

(2) Water and impurities are removed from the $FeCl_2.4H_2O$ and $FeCl_3.6H_2O$/α-pyrrolidone solution. The solution prepared in the step (1) is evacuated at the temperature of 200° C. for 30 min, so as to remove the small amount of water and low-boiling point impurities contained in the raw material.

(3) A $Fe_3O_4$ magnetic particle/α-pyrrolidone magnetic fluid is prepared. The $FeCl_2.4H_2O$ and $FeCl_3.6H_2O$/α-pyrrolidone solution, from which water is fully removed in the step (2), is fed with nitrogen to reach a standard atmospheric pressure, the temperature is lowered to 80° C., 8 g KOH powder is added and the solution is rapidly sealed, the temperature is raised to 200° C., and evacuation is performed for 3 h to obtain $Fe_3O_4$ magnetic particle/α-pyrrolidone magnetic fluid.

(4) In-situ polymerization of the $Fe_3O_4$ magnetic particle/α-pyrrolidone magnetic fluid. Nitrogen is fed into the system to reach a standard atmospheric pressure, 1.0 g acetylcaprolactam is added after the temperature is lowered to 120° C., uniform mixing is performed and then the mixture is subjected to reaction for 1 h at this temperature.

(5) The material prepared in the step (4), i.e. a polymeric product, is crushed and then extracted with water for 8 h to remove unpolymerized α-pyrrolidone, oligomer and soluble organic salts, the resultant product is fully dried at the temperature of 80° C. to obtain $Fe_3O_4$/nylon 4 composite polymer material, and the yield of the nylon 4 is 70%.

The particle diameter and content of the magnetic particles in the resultant nano $Fe_3O_4$/nylon 4 magnetic composite polymer material is about 100-160 nm and 8.0 wt % respectively, the saturation magnetization of the composite material is 6.5 emu/g, and the composite material is magnetically stable for a long time in an air atmosphere lower than 80° C.; the polymer matrix nylon 4 has a number average molecular weight of about 40000.

The above description made to the embodiments is intended for understanding and use of the present invention by ordinary skilled in this art. By those skilled who are familiar with this art, various modifications could be readily made to these embodiments, and the general principle described herein could be applied to other embodiments without creative efforts. Thus, the present invention is not limited to the embodiments described herein, and improvements and modifications made by those skilled in this art in accordance with the disclosure of the invention without departing from the scope of the invention shall be contemplated as being within the scope of the invention.

The invention claimed is:

1. A preparation method for a nano particle/polyamide composite material, characterized in that:
   a lactam is reacted, where the lactam is caprolactam or α-pyrrolidone, and where the preparation method for a nano particle/polyamide composite material comprises anionic polymerization;
   wherein the preparation for the nano particle/polyamide composite material by the anionic polymerization comprises the following steps:
   a mixture of nano particles and the lactam is added to the reactor, where the nano particles is 0.01-99 parts by weight; and the lactam is 100 parts by weight;
   evacuation is performed for 0.1-20 h at the temperature of 80-200° C.;
   0.01-10 parts by weight of catalyst is added to the reactor;
   water removal by evacuation is performed for 0.1-10 h at the temperature of 100-180° C. to form a resultant product; and
   the nano particle/polyamide composite material is obtained by polymerization according to one of the following two methods:
   (1) the resultant product is cooled down to 80-180° C., 0.01-10 parts by weight of activator is added, uniform mixing is performed, the mixture is transferred into a preheated mould, the temperature is constantly maintained for 0.1-12 h at the temperature of 120-200° C.; or:
   (2) the resultant product is cooled down to 80-160° C., 0.01-10 parts by weight of activator is added, uniform mixing is performed, and the mixture is transferred into a double-screw extruder for reaction and extrusion;
   wherein synthesis of the mixture of nano particles and the lactam by the precipitation comprises the following steps:
   0.01-100 parts by weight of precursor and 100 parts by weight of the lactam are added to the reactor, which are stirred for 0.1-2 h at the temperature of 80-150° C. so that the precursor is fully dissolved or dispersed in a molten lactam solvent;
   0.05-50 parts by weight of a precipitator is added to the reactor under stirring to complete the precipitation reaction for 0.1-200 h at the temperature of 80-250° C.; and thus the mixture of nano particles and the lactam is obtained;
   the precursor is selected from soluble inorganic salts formed by metal cation and halogen, nitrate, nitrite, sulfate, sulfite or carbonate anion; or the precursor is selected from the organic compounds containing metals or metalloids;
   the activator is a substance capable of lowering the anionic polymerization temperature of the lactam, and is selected from the group consisting of: acyl chloride, maleic anhydride, isocyanate, N-acylcaprolactam, carbonic ester and carboxylic ester; and
   the precipitator is selected from the group consisting of: alkaline metal, alkaline metal hydroxide, alkaline metal organic salt, ammonia and compounds capable of hydrogen release by pyrolysis, soluble inorganic salt formed by metal element and halogen element, soluble inorganic salt formed by metal element and chalcogenide, soluble inorganic salt formed by metal element and carbonate radical, and soluble inorganic salt formed by metal element and sulfate radical.

2. The preparation method for nano particle/polyamide composite material according to claim 1, characterized in that: in the process of anionic polymerization, the reaction and extrusion operations are as follows: a mixture of nano particles, the lactam, the catalyst and the activator is added to a double-screw extruder through a double-screw inlet at the speed of 0.1-10000 g/min; screws of the double-screw extruder rotate at a speed of 50-500 r/min, and the temperatures are as follows: 80-150° C. for area I, 120-200° C. for area II, 200-240° C. for area III, 200-280° C. for area IV, 220-280° C. for area V, 220-280° C. for area VI and 220-250° C. for area VII; then the nano particle/polyamide composite material is extruded from the outlet, cooled down and pelletized.

3. The preparation method for nano particle/polyamide composite material according to claim 1, characterized in that: the catalyst in the anionic polymerization is a substance being capable of driving the lactam to form an anion active center, which is selected from the group consisting of: Na, K, NaOH, KOH, $NaOCH_3$, $NaOC_2H_5$, $KOC_2H_5$, sodium butyrolactam, sodium caprolactam, potassium caprolactam and sodium phenolate.

4. The preparation method for nano particle/polyamide composite material according to claim 1, characterized in that: in the process of synthesis of the mixture of nano particles and the lactam, the precursor is selected from the group consisting of: $MgCl_2.6H_2O$, $Nd(NO_3)_3.6H_2O$, $Y(NO_3)_3.6H_2O$, $AlCl_3.9H_2O$, $Al_2(SO_4)_3.18H_2O$, $ZnCl_2$, $AgNO_3$, $CuSO_4.5H_2O$, $FeCl_2.4H_2O$, $FeCl_3.6H_2O$, $Cd(NO_3)_2.2H_2O$, $BaCl_2$ and $PdCl_2$; or the precursor is selected from the group consisting of: zinc acetate, carbonyl iron, ferric acetylacetonate, iron oleate, butyl titanate and ethyl orthosilicate.

5. The preparation method for nano particle/polyamide composite material according to claim 1, characterized in that: in the process of synthesis of the mixture of nano particles and the lactam, the alkaline metal is selected from the group consisting of: Li, Na and K; the alkaline metal hydroxide is selected from the group consisting of: NaOH and KOH; the alkaline metal organic salt is selected from the group consisting of: sodium methylate, sodium alcoholate, sodium phenolate, potassium oleate, sodium lactam or potassium caprolactam; ammonia and compounds capable of hydrogen release by pyrolysis are selected from ammonia, ammonia water, urea, ammonium carbonate and ammonium hydrogen carbonate; the soluble inorganic salt formed by metal element and halogen element is selected from the group consisting of: NaCl, KCl, $MgCl_2$, $CaCl_2$, $AlCl_3.6H_2O$, $FeCl_2.4H_2O$ and $FeCl_3 \cdot 6H_2O$; the soluble inorganic salt formed by metal element and chalcogenide is selected from the group consisting of: $Na_2S$, $K_2S$, $Na_2S \cdot 9H_2O$, $Na_2Se$ and $NaHTe$; the soluble inorganic salt formed by metal element and carbonate radical is selected from the group consisting of: $Na_2CO_3$ and $K_2CO_3$; and the soluble inorganic salt formed by metal element and sulfate radical is selected from the group consisting of: $Na_2SO_4$ and $K_2SO_4$.

6. The preparation method for nano particle/polyamide composite material according to claim 1, characterized in that: 0.05-50 parts by weight of a reducing agent is added after addition of the precipitator in the process of synthesizing the mixture of nano particles and the lactam by the precipitation method.

7. The preparation method for the nano particle/polyamide composite material according to claim 6, characterized in that: the reducing agent is selected from the group consisting of: ascorbic acid, potassium borohydride, sodium borohydride, hydrazine, hydrazine hydrate, hydroxylamine, and aldehyde-containing organic compound; wherein: the aldehyde-containing organic compound is selected from the group consisting of: formaldehyde, acetaldehyde, glyoxal, benzaldehyde, and glucose.

8. The preparation method for the nano particle/polyamide composite material according to claim 1, characterized in that: 0.01-20 parts by weight of a stabilizing agent and 0.1-80 parts by weight of insoluble inorganic compound are added after addition of the lactam in the process of synthesizing the mixture of nano particles and the lactam by the precipitation.

9. The preparation method for the nano particle/polyamide composite material according to claim 7, characterized in that: the stabilizing agent is selected from the group consisting of: anionic surfactant, cationic surfactant, amphoteric surfactant and nonionic surfactant, which regulate the appearance of synthesized nano material; wherein: the anionic surfactant is selected from the group consisting of: sodium dodecyl sulfate, sodium benzenesulfonate and sodium oleate; the cationic surfactant is selected from the group consisting of: tetrapropyl ammonium hydroxide, tetrapropylammonium bromide, tetrapropylammonium chloride, hexadecyl trimethyl ammonium bromide, hexadecyl trimethyl ammonium chloride and dodecyl trimethyl ammonium ammonium bromide; the amphoteric surfactant is selected from the group consisting of: dodecyl ethoxy sulfobetaine, octadecyl dihydroxyethyl amine oxide and stearamide propyl amine oxide; and the nonionic surfactant is selected from the group consisting of: triblock copolymer, polyethylene glycol, polyvinyl pyridine, glycerol and 2-mercaptopropionic acid.

10. The preparation method for the nano particle/polyamide composite material according to claim 8, characterized in that: the insoluble inorganic compound refers to a substance serving as a carrier or an attachment point of synthesized nano material, and is selected from the group consisting of: activated carbon, graphene, carbon fiber, carbon nanotube, molecular sieve, smectite clay, diatomite, glass fiber and glass microsphere.

* * * * *